United States Patent
Yoshida et al.

(10) Patent No.: US 6,273,837 B1
(45) Date of Patent: Aug. 14, 2001

(54) BELT FOR CONTINUOUSLY VARIABLE TRANSMISSION

(75) Inventors: Hideaki Yoshida; Takamichi Shimada; Hirofumi Akagi, all of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/404,736

(22) Filed: Sep. 24, 1999

(30) Foreign Application Priority Data

Sep. 25, 1998 (JP) .................................. 10-271596

(51) Int. Cl.$^7$ .................. F16G 1/00; F16G 1/22
(52) U.S. Cl. ............................ 474/242; 474/201
(58) Field of Search .................... 474/201, 242, 474/244, 272, 265, 245; 198/810, 810.02, 502.1, 810.04

(56) References Cited

U.S. PATENT DOCUMENTS

| | | | | |
|---|---|---|---|---|
| 4,512,753 | * | 4/1985 | Hattori | 474/242 |
| 4,526,561 | * | 7/1985 | Hattori | 474/242 |
| 4,619,634 | * | 10/1986 | Nakawaki | 474/201 |
| 4,621,727 | * | 11/1986 | Strader | 198/810 |
| 4,642,077 | * | 2/1987 | Hattori et al. | 474/242 X |
| 6,047,814 | * | 4/2000 | Alles et al. | 198/810.02 |

FOREIGN PATENT DOCUMENTS

| | | | |
|---|---|---|---|
| 787699 | * | 8/1997 | (EP) . |
| 0 828 096 | | 3/1998 | (EP) . |
| 2 087 032 | | 5/1982 | (GB) . |
| 57-57938 | | 7/1982 | (JP) . |
| 303943 | * | 8/1997 | (JP) . |

OTHER PUBLICATIONS

Patent Abstracts of Japan, vol. 11, No. 213 (M–605), Jul. 10, 1987 & JP 62 028548, Feb. 6, 1987.

* cited by examiner

*Primary Examiner*—David A. Bucci
*Assistant Examiner*—Marcus Charles
(74) *Attorney, Agent, or Firm*—Arent Fox Kintner Plotkin & Kahn

(57) ABSTRACT

The durability of the entire metal ring assembly is enhanced by increasing the wear life of the radially inner surface of the metal ring of the innermost layer which is the layer which is most easily fractured. A belt for a continuously variable transmission is formed by supporting a large number of metal elements on a metal ring assembly wherein multiple sheets of endless metal rings are layered. The thickness of the metal ring of the innermost layer is different from the thickness of the metal rings of layers other than the innermost layer. The thickness of the metal ring of the innermost layer is set so that the stress amplitude applied to the radially outer surface of the metal ring of the innermost layer is not more than the stress amplitude applied to the radially outer surfaces of the metal rings of layers other than the innermost layer. By setting the thickness of the metal ring of the innermost layer at 0.042 mm to 0.161 mm when the thickness of the metal rings of layers other than the innermost layer is 0.185 mm, the stress amplitude $\sigma a_1$ applied to the metal ring of the innermost layer becomes lower than the stress amplitude $\sigma a_n$ of 25.65 kgf/- mm$^2$ applied to the other metal rings. Thus the durability of the metal ring of the innermost layer can be enhanced to increase the life span of the entire metal ring assembly.

4 Claims, 17 Drawing Sheets

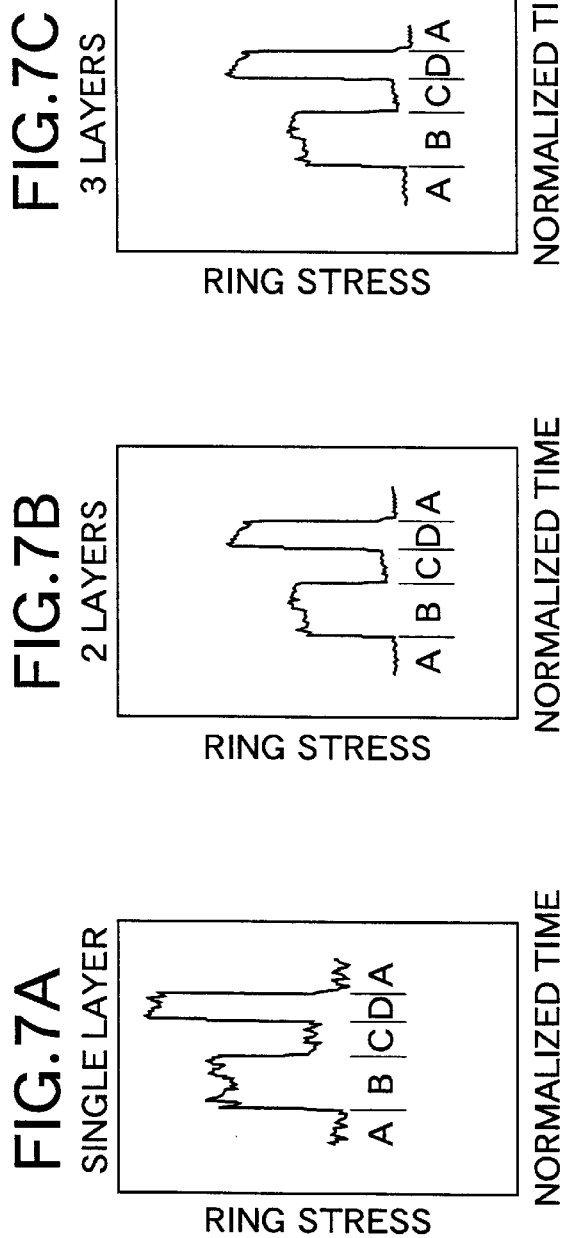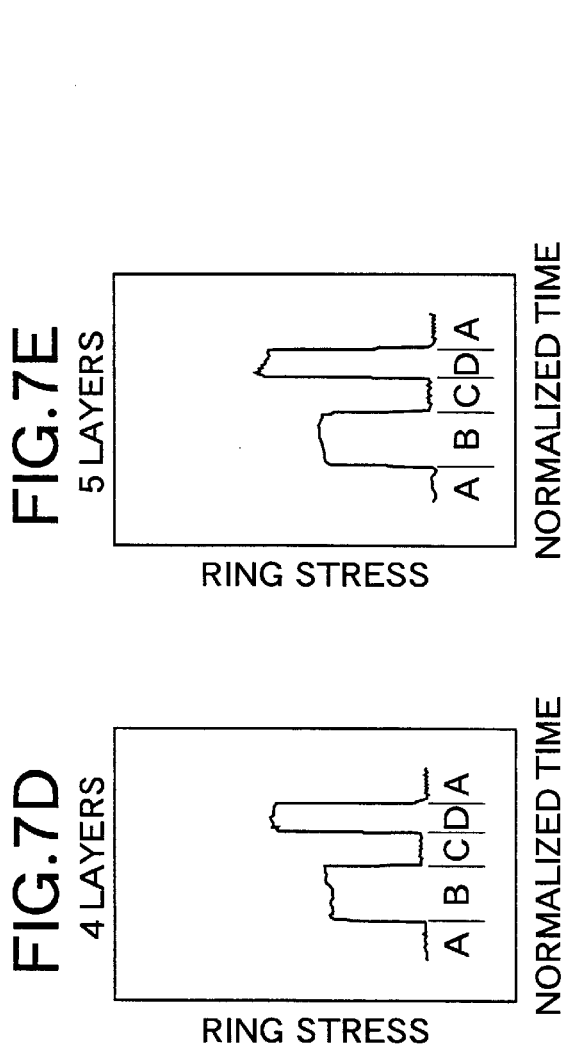

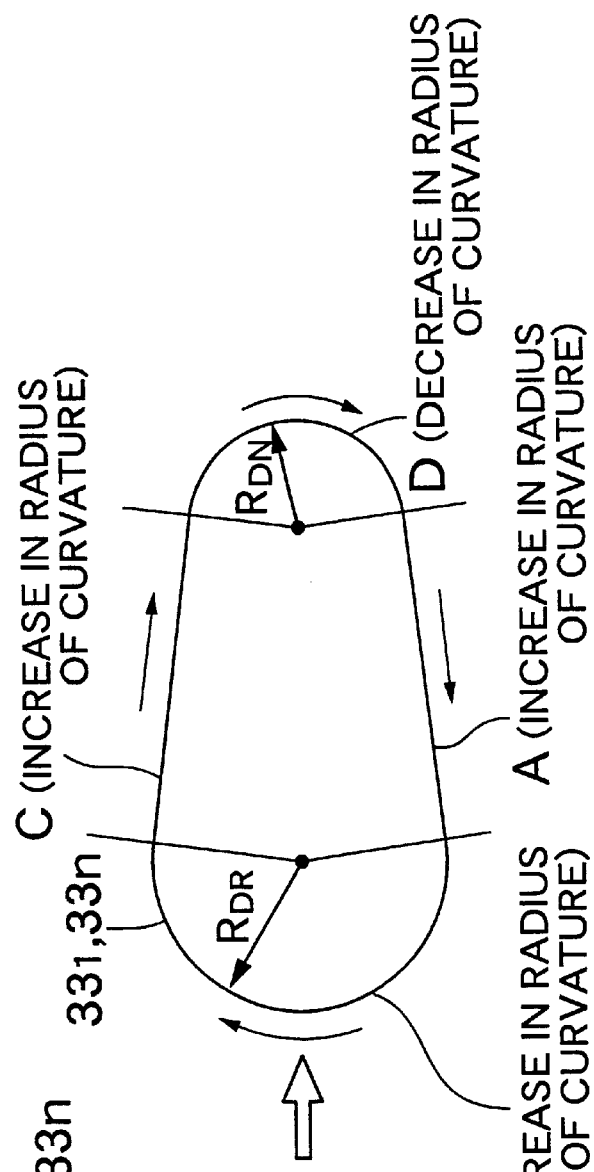
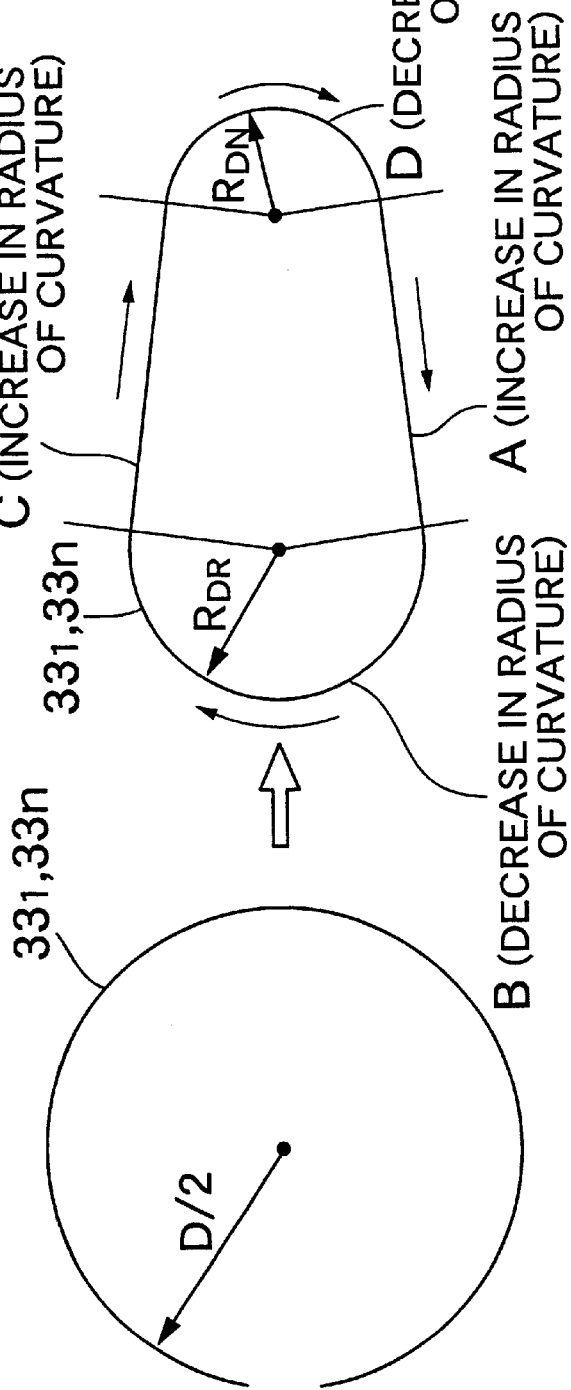

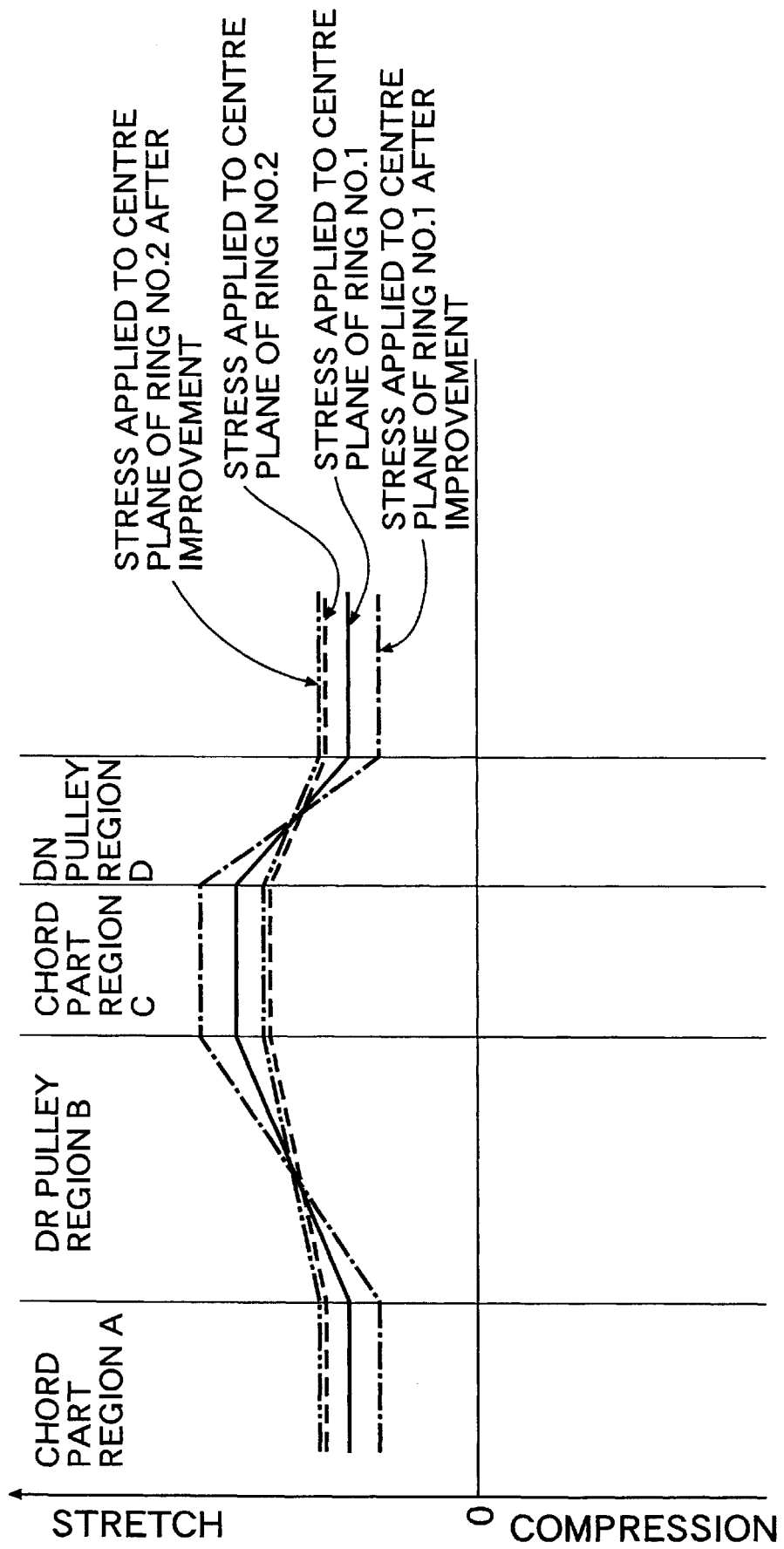

BELT FOR CONTINUOUSLY VARIABLE TRANSMISSION

BACKGROUND OF THE INVENTION

1. Field of the Invention

The present invention relates to belts for a continuously variable transmission. The belts are formed by supporting a large number of metal elements on a metal ring assembly wherein multiple sheets of endless metal rings are layered.

2. Description of the Prior Art

When a metal belt of a continuously variable transmission is gripped by V-faces of its drive pulley and driven pulley, tension is generated in the metal belt. Since the tension varies depending on the drive power and the braking power produced by the two pulleys, the tensile stress applied to each metal ring changes periodically with the circulation of the metal belt. Moreover, since the circulating metal belt is bent where it wraps around the pulleys and is stretched in the chord parts between the pulleys, the flexural stress applied to each metal ring also varies periodically. As a result, the total stress (the sum of the above-mentioned tensile stress and the above-mentioned flexural stress) applied to each metal ring varies periodically during one revolution of the metal belt.

Japanese Patent Application Laid-Open No. 57-57938 has therefore proposed that by applying a) a residual compressive stress to the radially outer surface of each metal ring of the metal ring assembly and b) a residual stretching stress to the radially inner surface, the median of the stress amplitude (stress median) applied to each metal ring, which varies periodically, is made as close to 0 as possible thereby attempting to extend the wear life of the metal belt.

The above-mentioned conventional arrangement does not differentiate between the metal ring of the innermost layer from the other metal rings. A residual compressive stress is applied to the radially outer surfaces of all the metal rings, and a residual stretching stress is applied to the radially inner surfaces. Therefore, the durability of the entire metal belt is restricted by the durability of the metal ring of the innermost layer which is used under severe conditions such as those resulting from large changes in tension. Moreover, the processing needed in order to apply the residual compressive stress and the residual stretching stress to the radially outer and inner surfaces of each metal ring becomes a principal cause for increased cost.

SUMMARY OF THE INVENTION

The present invention has been conducted in view of the above-mentioned circumstances, and it is an objective of the present invention to increase the durability of the entire metal ring assembly by prolonging the wear life of the metal ring of the innermost layer which is the one which is most easily fractured.

The metal ring of the innermost layer of such a metal ring assembly is in direct contact with the saddle surfaces of the metal elements, whereas the radially inner surfaces of the other metal rings are in direct contact with the radially outer surfaces of the other metal rings. Therefore, the coefficients of friction of the two contact areas are different from each other. More specifically, the coefficient of friction of the radially inner surface of the metal ring of the innermost layer, which is in direct contact with the saddle surfaces of the metal elements, has actually been measured and found to be larger than the coefficient of friction of the radially inner surfaces of the other metal rings. As a result, as is described in detail in the embodiment below, the change in tension applied to the metal ring of the innermost layer (the difference between the maximum tension and the minimum tension in one cycle) becomes larger than the changes in tension applied to the other metal rings.

In order to achieve the above-mentioned objective, the present invention is a belt for a continuously variable transmission formed by supporting a large number of metal elements on a metal ring assembly wherein multiple sheets of endless metal rings are layered. The thickness of the metal ring of the innermost layer is different from the thickness of the metal rings of layers other than the innermost layer. The thickness of the metal ring of the innermost layer is set so that the stress amplitude applied to the metal ring of the innermost layer is not more than the stress amplitude applied to the metal rings of layers other than the innermost layer.

The invention is further characterized in that the thickness of the metal ring of the innermost layer is set so that the stress amplitude applied to the metal ring of the innermost layer is not more than the stress amplitude applied to the metal rings of layers other than the innermost layer provided that the difference between the tension applied to the chord part on the stretched side and the tension applied to the chord part on the relaxed side of the metal ring of the innermost layer is different from a difference between tension of the chord part on the stretched side and the tension of the chord part on the relaxed side of the metal rings of layers other than the innermost layer. The sum of the tension of the chord part on the stretched side and the tension of the chord part on the relaxed side of the metal ring assembly is distributed evenly in the radial direction of the metal ring assembly.

The invention is further characterized in that the thickness of the metal ring of the innermost layer is set so that at a maximum horsepower operating state, the stress amplitude applied to the metal ring of the innermost layer coincides with the stress amplitude applied to the metal rings of layers other than the innermost layer.

Since the coefficient of friction of the radially inner surface of the metal ring of the innermost layer, which is in contact with the saddle surfaces of the metal elements, is larger than the coefficient of friction between the metal rings which are in contact with each other, the change in tension applied to the metal ring of the innermost layer (i.e., a difference in tension between the chord part on the stretched side and the chord part on the relaxed side) becomes larger than the change in tension applied to the other metal rings, and the stress amplitude applied to the metal ring of the innermost layer accompanying the change in tension becomes larger than the stress amplitude applied to the other metal rings. As a result, if the thickness of the metal ring of the innermost layer is set at a value equal to the thickness of the other metal rings, when considering the total stress which comprises the tensile stress applied to the metal rings and the flexural stress applied to the metal rings , the total stress amplitude applied to the metal ring of the innermost layer becomes larger than the total stress amplitude applied to the other metal rings. Thus the durability of the metal ring of the innermost layer is restricted.

By differentiating the thickness of the metal ring of the innermost layer, which is used under the most severe conditions, from the thickness of the other metal rings so as to differentiate the flexural stress applied to the metal ring of the innermost layer from the flexural stress applied to the other metal rings, the total stress amplitude applied to the metal ring of the innermost layer can therefore be reduced so as to be not more than the total stress amplitude applied to the other metal rings. That is to say, if the thickness of the metal ring of the innermost layer is set so that the total stress amplitude applied to the metal ring of the innermost layer is not more than the total stress amplitude applied to the other metal rings, the durability of the metal ring of the innermost layer, which is used under the most severe conditions, can be made higher than the durability of the other metal rings to increase the life span of the entire metal ring assembly.

In particular, if the difference between the tension applied to the chord part on the stretched side and the tension applied to the chord part on the relaxed side of the metal ring of the innermost layer is assumed to be different from a difference between the tension of the chord part on the stretched side and the tension of the chord part on the relaxed side of the metal rings of layers other than the innermost layer and the sum of the tension of the chord part on the stretched side and the tension of the chord part on the relaxed side of the metal ring assembly is assumed to be distributed evenly in the radial direction of the metal ring assembly, the thickness of the metal ring of the innermost layer can be set appropriately.

Furthermore, if the thickness of the metal ring of the innermost layer is set so that at a maximum horsepower operating state the stress amplitude applied to the metal ring of the innermost layer coincides with the stress amplitude applied to the metal rings of layers other than the innermost layer, the durability of the metal ring of the innermost layer can be increased to the highest level under all operating conditions including the most severe operating conditions at the maximum horsepower operating state.

BRIEF DESCRIPTION OF THE DRAWINGS

The present invention is described below by reference to the Embodiment of the present invention shown in the attached drawings.

FIG. 1 to FIG. 17 illustrate one embodiment of the present invention.

FIG. 1 is an outline diagram of the power transmission system of a vehicle on which a continuously variable transmission is mounted.

FIG. 2 is a perspective view of a part of a metal belt.

FIG. 3 is an illustration for explaining the tensile stress which is applied to a metal ring.

FIG. 4 is an illustration showing the balance between the forces applied to the metal ring.

FIG. 5 is a graph illustrating the change in $\Delta T_1 / \Delta T_{ALL}$ relative to the ratio of the coefficients of friction.

FIG. 6 is a perspective view of a part of the metal belt used for an experiment to determine the characteristics of the change in stress applied to the metal ring.

FIGS. 7A–7E are graphs illustrating the change in stress applied to the metal rings determined by an experiment.

FIG. 8 is a graph illustrating the ratio $Ta_{(n)}/Ta_{(all)}$ of the tension difference $Ta_{(n)}$ between the two chord parts of the metal ring of the outermost layer relative to the tension difference $Ta_{(all)}$ between the two chord parts of the metal ring assembly.

FIG. 9 is a graph illustrating the ratio $Tm_{(n)}/Tm_{(all)}$ of the sum $Tm_{(n)}$ of the tensions of the two chord parts of the metal ring of the outermost layer relative to the sum $Tm_{(all)}$ of the tensions of the two chord parts of the metal ring assembly.

FIGS. 10A–10B are an illustrations for explaining the shapes in the free state and the engaged state of a metal ring.

FIG. 11 is a graph illustrating the distribution of tensile stress applied to the metal ring of the innermost layer and the other metal rings.

FIG. 12 is a graph illustrating the distribution of flexural stress applied to the metal ring of the innermost layer and the other metal rings.

FIG. 13 is a graph illustrating the distribution of total stress applied to the metal ring of the innermost layer and the other metal rings.

FIG. 14 is an illustration for explaining the calculation of the stress amplitude aa1 applied to the metal ring of the innermost layer.

FIG. 15 is a graph illustrating the change in stress amplitude $\sigma a_1$ relative to t he thickness $t_1$ of the metal ring of the innermost layer.

FIG. 16 is a graph illustrating the thickness $t_1$ at which the stress amplitude $\sigma a_1$ coincides with the stress amplitude $\sigma a_1$ and the thickness $t_1$ at which the stress amplitude $\sigma a_1$ is a minimum.

FIG. 17 is a graph illustrating the thickness ratio $t_1/t_n$ at which the stress amplitude $\sigma a_1$ coincides with the stress amplitude $\sigma a_n$ and the thickness ratio $t_1/t_n$ at which the stress amplitude $\sigma a_1$ is a minimum.

DESCRIPTION OF THE PREFERRED EMBODIMENT

Figure 1:
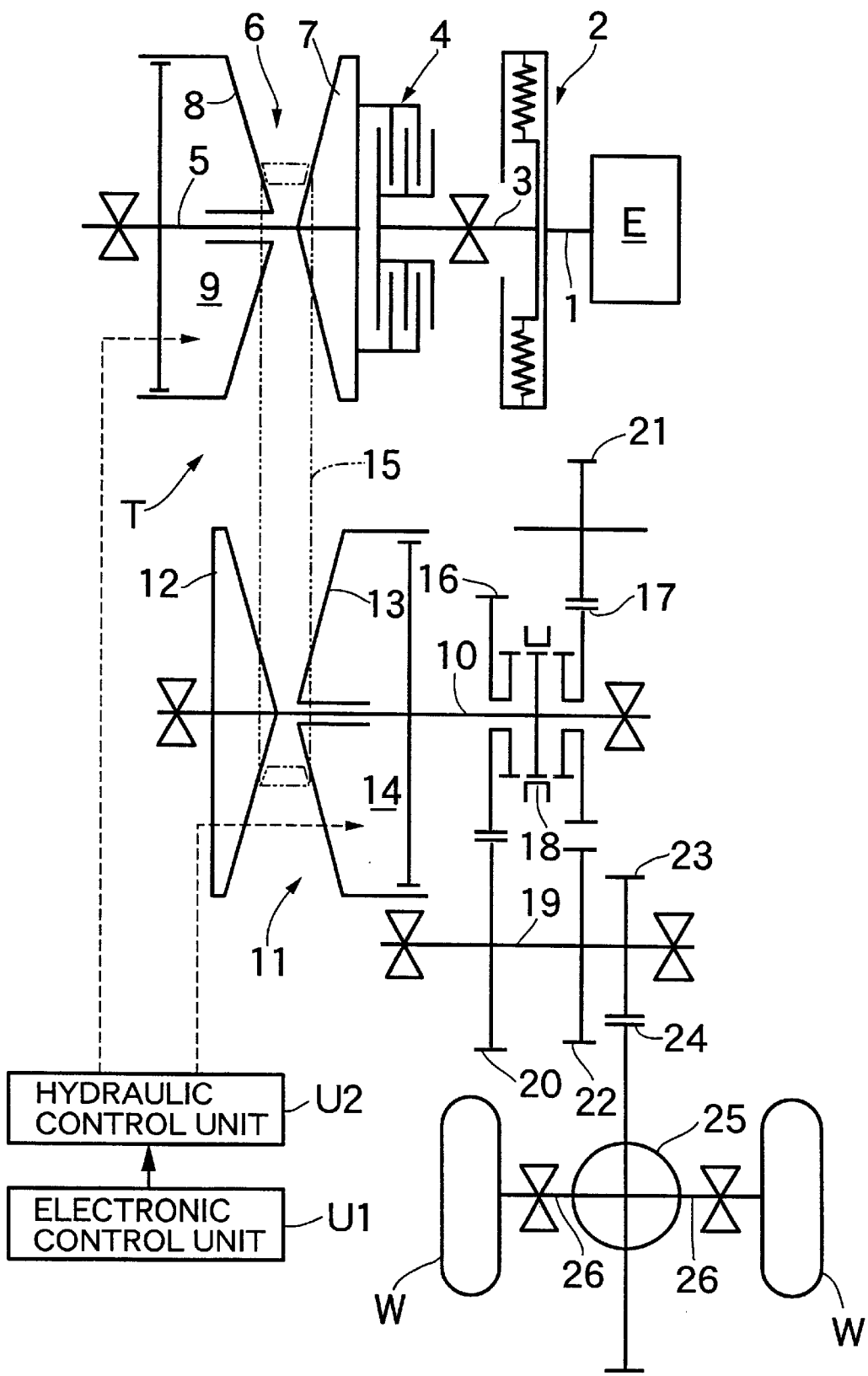

FIG. 1 shows an outline of the structure of a metal belt type continuously variable transmission T mounted in an automobile, in which an input shaft 3 connected to a crankshaft 1 of an engine E via a damper 2 is connected to a drive shaft 5 of the metal belt type continuously variable transmission T via a starting clutch 4. A drive pulley 6 mounted on the drive shaft 5 comprises a stationary pulley 7 which is secured to the drive shaft 5 and a movable pulley 8 which is movable towards and away from the stationary pulley 7. The movable pulley 8 is pushed towards the stationary pulley 7 by means of hydraulic pressure applied to an oil chamber 9.

A driven pulley 11, mounted on a driven shaft 10 positioned parallel to the drive shaft 5, comprises a stationary pulley 12 which is secured to the driven shaft 10 and a movable pulley 13 which is movable towards and away from the stationary pulley 12. The movable pulley 13 is pushed towards the stationary pulley 12 by means of hydraulic pressure applied to an oil chamber 14. A metal belt 15 is formed by supporting a large number of metal elements 32 . . . on a pair of right and left metal ring assemblies 31, 31 (see FIG. 2). The metal belt 15 is wrapped around both the drive pulley 6 and the driven pulley 11. Each metal ring assembly 31 is formed by layering 12 sheets of metal rings $33_1, 33_n \ldots$ The driven shaft 10 carries a forward drive gear 16 and a reverse drive gear 17 in a relatively rotatable manner. The forward drive gear 16 and reverse drive gear 17 can be connected selectively to the driven shaft 10 by means of a selector 18. An output shaft 19 is positioned parallel to the driven shaft 10. A forward driven gear 20 is meshed with the forward drive gear 16, and a reverse driven gear 22 is meshed with the reverse drive gear 17 via a reverse idler gear 21. The gears 20 and 22 are secured with the output shaft 19.

The rotation of the output shaft 19 is input to a differential 25 via a final drive gear 23 and a final driven gear 24 and transmitted therefrom to drive wheels W, W via right and left axles 26, 26.

The drive power of the engine E is thus transmitted to the driven shaft 10 via the crankshaft 1, the damper 2, the input shaft 3, the starting clutch 4, the drive shaft 5, the drive pulley 6, the metal belt 15 and the driven pulley 11. When the forward travel range is selected, the drive power of the driven shaft 10 is transmitted to the output shaft 19 via the forward drive gear 16 and forward driven gear 20, and the vehicle is thus driven forward. When the reverse travel range is selected, the drive power of the driven shaft 10 is transmitted to the output shaft 19 via the reverse drive gear 17, reverse idler gear 21 and reverse driven gear 22, and thus the vehicle is driven backwards.

At this stage, by controlling the hydraulic pressures applied to the oil chamber 9 of the drive pulley 6 and the oil chamber 14 of the driven pulley 11 of the metal belt type continuously variable transmission T by means of a hydraulic control unit $U_2$ operated by commands from an electronic control unit $U_1$, the gear ratio can be adjusted continuously. That is to say, by increasing the hydraulic pressure applied to the oil chamber 14 of the driven pulley 11 relative to the hydraulic pressure applied to the oil chamber 9 of the drive pulley 6, the groove width of the driven pulley 11 decreases thereby increasing the effective radius of the drive pulley 6. Accordingly, the groove width of the drive pulley 6 increases thereby decreasing the effective radius of the driver pulley 11. Therefore the gear ratio of the metal belt type continuously variable transmission T changes towards "LOW" in a continuous manner. On the other hand, by increasing the hydraulic pressure applied to the oil chamber 9 of the drive pulley 6 relative to the hydraulic pressure applied to the oil chamber 14 of the driven pulley 11, the groove width of the drive pulley 6 decreases thereby increasing the effective radius of the driven pulley 11. Accordingly, the groove width of the driven pulley 11 increases thereby decreasing the effective radius of the drive pulley 6. Therefore, the gear ratio of the metal belt type continuously variable transmission T changes towards "TOP" in a continuous manner.

Figure 3:
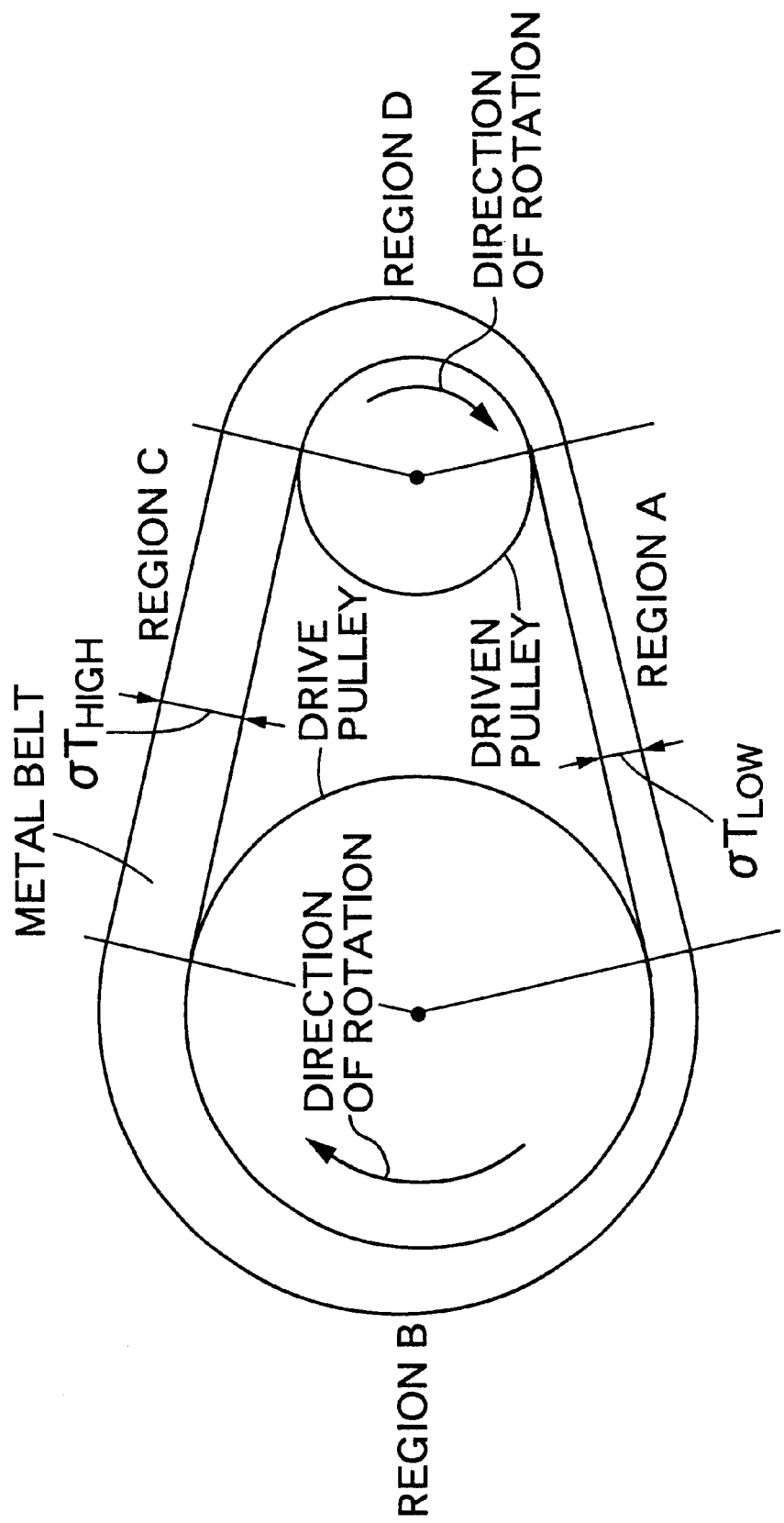

FIG. 3 shows a state in which the vehicle is in the maximum travelling speed state (TOP state) and the effective radius of the drive pulley 6 becomes larger than the effective radius of the driven pulley 11. The thickness of the metal belt 15 indicates the level of tensile stress applied to each metal ring assembly 31 resulting from the tension in the above-mentioned metal belt 15. In the chord part on the relaxed side (region A) where the metal belt 15 returns from the driven pulley 11 to drive pulley 6 the above-mentioned stress is at a constant value of $\sigma T_{LOW}$. In the chord part on the stretched side (region C), where the metal belt 15 is fed from the drive pulley 6 to the driven pulley 11, the above-mentioned stress is at a constant value of $\sigma T_{HIGH}$. The stress $\sigma T_{LOW}$ in region A is smaller than the stress $\sigma T_{HIGH}$ in region C. The stress increases from $\sigma T_{LOW}$ to $\sigma T_{HIGH}$ in going from the entry side to the exit side in the region (region B) where the metal belt 15 is wrapped around the drive pulley 6. The stress decreases from $\sigma T_{HIGH}$ to $\sigma T_{LOW}$ in going from the entry side to the exit side in the region (region D) where the metal belt 15 is wrapped around the driven pulley 11.

Figure 4:
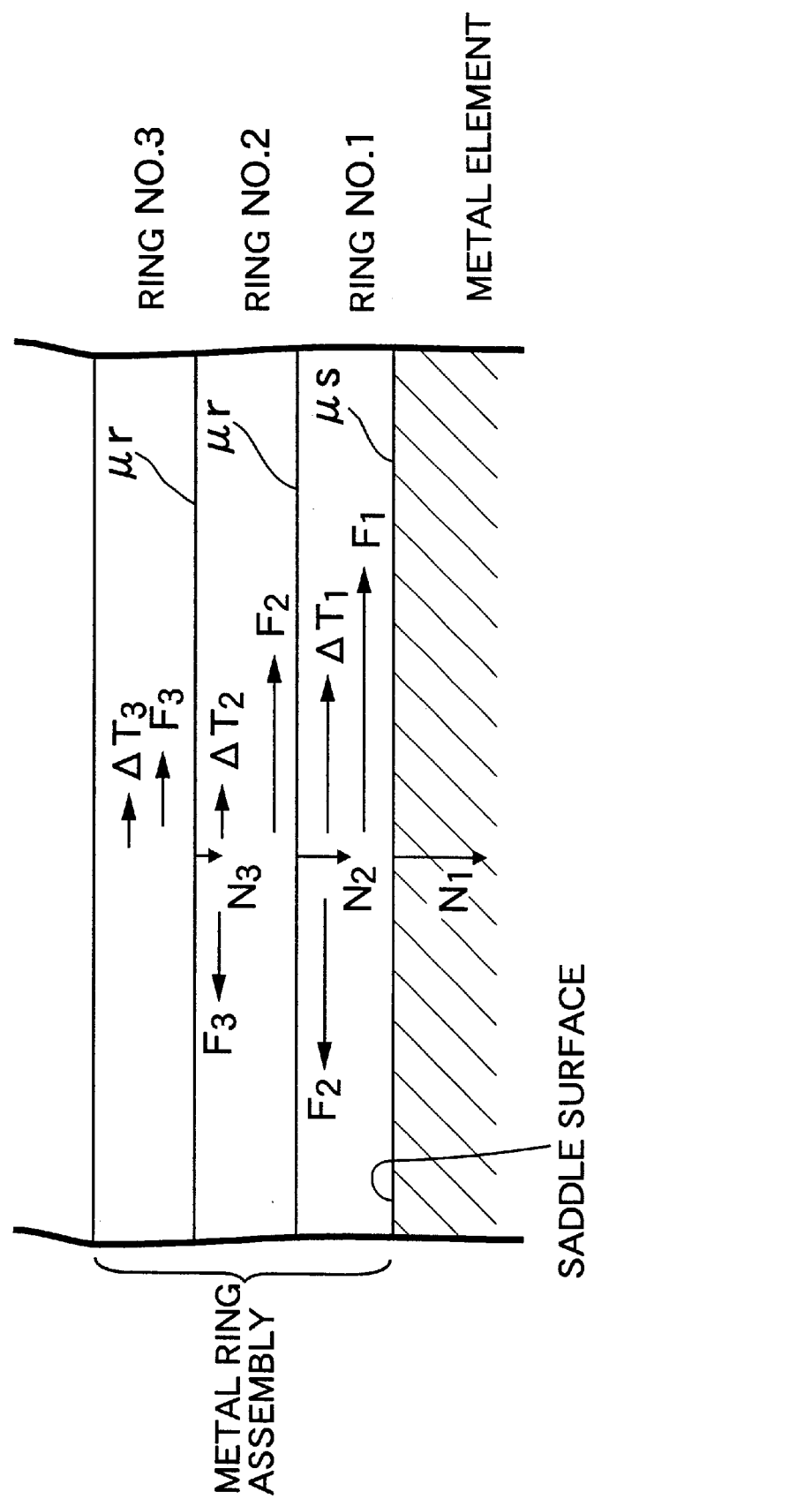

The tension applied to the metal belt 15 is evenly shared by a pair of metal ring assemblies 31, 31. The tension applied to each metal ring assembly 31 is shared among 12 sheets of metal rings $33_1, 33_n \ldots$ which form the metal ring assembly 31. Here, the stresses applied to metal rings $33_n \ldots$ (ring No. 2 to ring No. 12) of the second layer to the 12th layer from the inside, (excluding the metal ring $33_1$ (ring No. 1) of the innermost layer which is in contact with the saddle surfaces $32_1$ of the metal elements 32) are equal to each other. However, the stress applied to the above-mentioned metal ring $33_1$ of the innermost layer has a value different from that for the above-mentioned stresses applied to the metal rings 33 of the second layer to the 12th layer. The reason therefor is explained below with reference to FIG. 4.

As a simple model, a case is considered where the metal ring assembly comprises three layers of metal rings. A perpendicular drag applied between ring No. 3 of the outermost layer and ring No. 2 inside ring No. 3 in the areas where the two rings are wrapped around a pulley is defined as $N_3$. A perpendicular drag applied between ring No. 2 and ring No. 1 is defined as $N_2$. A perpendicular drag applied between ring No. 1 and the saddle surface of the metal ring is defined as $N_1$. When the coefficient of friction between metal rings which are in contact with each other (hereinafter, termed ring-ring coefficient of friction) is defined as $\mu r$. The coefficient of friction between the metal ring and the metal element (hereinafter, termed ring-element coefficient of friction) is defined as $\mu s$. The loads on ring No. 1, ring No. 2 and ring No. 3 are defined as $F_1$, $F_2$ and $F_3$ respectively. The changes in tension applied to the metal rings of each layer $\Delta T_1$, $\Delta T_2$ and $\Delta T_3$ are given by equations (1) to (3) below.

$$\Delta T_3 = F_3 = \mu r N_3 \tag{1}$$

$$\Delta T_2 = F_2 - F_3 = \mu r N_2 - \mu r N_3 \tag{2}$$

$$\Delta T_1 = F_1 F_2 = \mu s N_1 - \mu r N_2 \tag{3}$$

The total change $\Delta T_{ALL}$ in the tensions applied to the metal rings of each layer $\Delta T_1$, $\Delta T_2$ and $\Delta T_3$ is given by $$\Delta T_{ALL} = \Delta T_1 + \Delta T_2 + \Delta T_3 \tag{4}$$
$$= (\mu s N_1 - \mu r N_2) + (\mu r N_2 - \mu r N_3) + \mu r N_3$$
$$= \mu s N_1$$

and the ratio of $\Delta T_1$ to $\Delta T_{ALL}$ can be derived from the above-mentioned equation (3) and equation (4).

$$\Delta T_1 / \Delta T_{ALL} = (\mu s N_1 - \mu r N_2)/(\mu s N_1) \tag{5}$$
$$= 1 - (\mu r / \mu s) \cdot (N_2 / N_1)$$

Here, even when considering a case where the number of metal ring layers is extended to n, the ratio of $\Delta T_1$ to $\Delta T_{ALL}$ can be derived in the same manner using the above-mentioned equation (5). However, as the number of metal ring layers n changes, the ratio of the perpendicular drag $N_1$ to the perpendicular drag $N_2$ changes, and therefore the results of the calculation are different.

If a coefficient of friction ratio which is the ratio of the ring-element coefficient of friction $\mu s$ to the ring-ring coefficient of friction $\mu s$ is defined here as $\xi(=\mu s /\mu r)$ the above-mentioned equation (5) can be transformed as follows.

$$\Delta T_1 / \Delta T_{ALL} = 1 - (N_2/N_1)/\xi \tag{6}$$

The above-mentioned equation (6) illustrates that if $N_2/N_1$, which depends on the number of metal ring layers n included in a metal ring assembly, and the coefficient of friction ratio $\xi$, which is the ratio of the ring-element coefficient of friction $\mu s$ to the ring-ring coefficient of friction $\mu r$, are determined, then the ratio of the change $\Delta T_1$ in the tension applied to the metal ring of the innermost layer relative to the change $\Delta T_{ALL}$ in the tension applied to the entire metal ring assembly can be determined.

Figure 5:
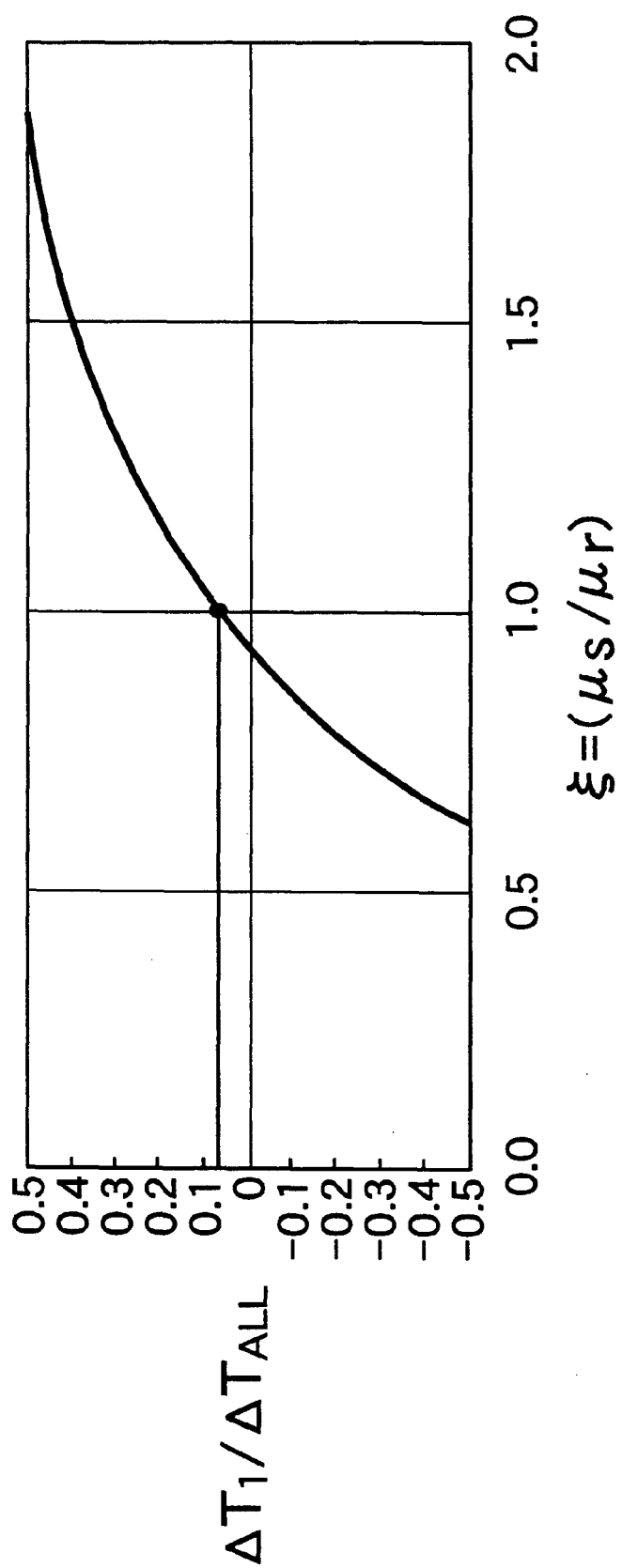

The graph in FIG. 5 shows the results of calculating $\Delta T_1/\Delta T_{ALL}$ for various coefficient of friction ratios $\xi$ when the metal ring assembly comprises 12 sheets of metal rings (i.e. n =12). The ratio of the perpendicular drags $N_1$, $N_2$ is set so as to be in a predetermined relationship, that is to say, it satisfies the relationship $N_2/N_1=(n-1)/n$. From previous experience and the experimental results, if the metal ring of the innermost layer is the same as the other metal rings, since the ring-element coefficient of friction $\mu s$ is larger than the. ring-ring coefficient of friction $\mu r$, the coefficient of friction ratio $\xi(=\mu s/\mu r)$ becomes greater than 1.0.

If the ring-ring coefficient of friction $\mu r$ is made to coincide with the ring-element coefficient of friction $\mu s$ in FIG. 5, the coefficient of friction ratio $\xi$ equals 1.0 and $\Delta T_1/\Delta T_{ALL}$ becomes 0.08. Thus, the metal ring of the innermost layer receives the same change in tension as the remaining 11, sheets of metal rings, that is to say, about 8% which is one 12th of the total change in tension $\Delta T_{ALL}$ of the entire metal ring assembly. However, the actual coefficient of friction ratio $\xi$ has a value larger than 1.0, and the change in tension $\Delta T_1$ applied to the metal ring of the innermost layer becomes larger than the change in tension $\Delta T_n$ applied to the other 11 sheets of metal rings.

Figure 2:
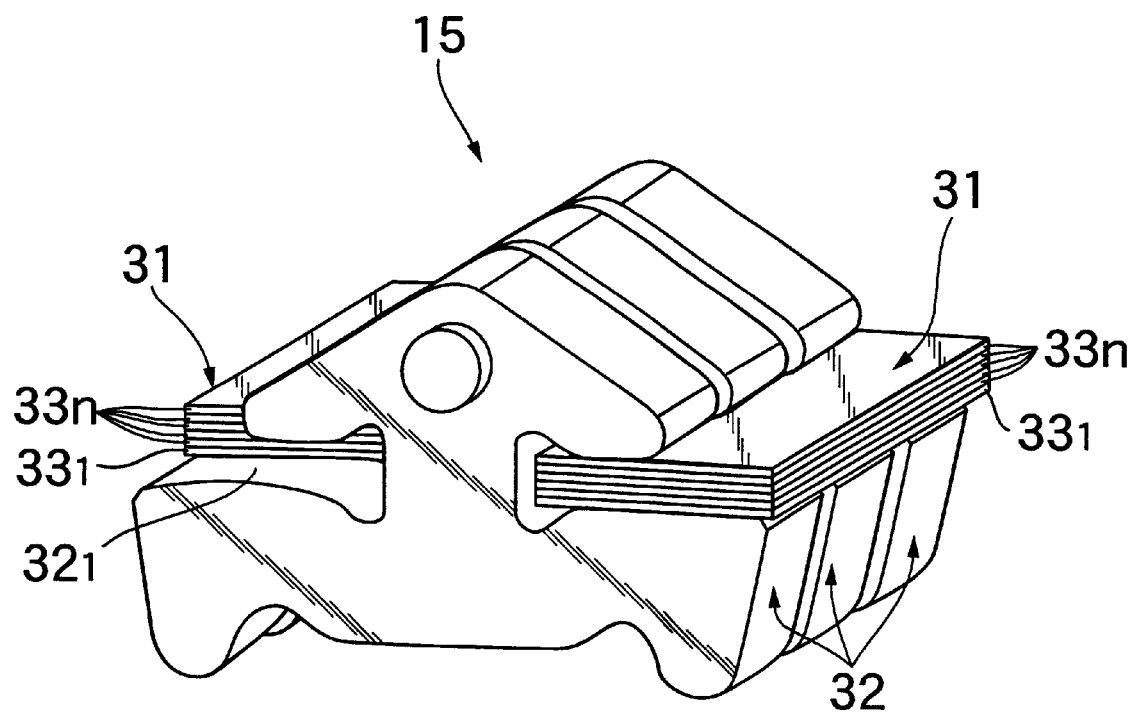
Figure 6:
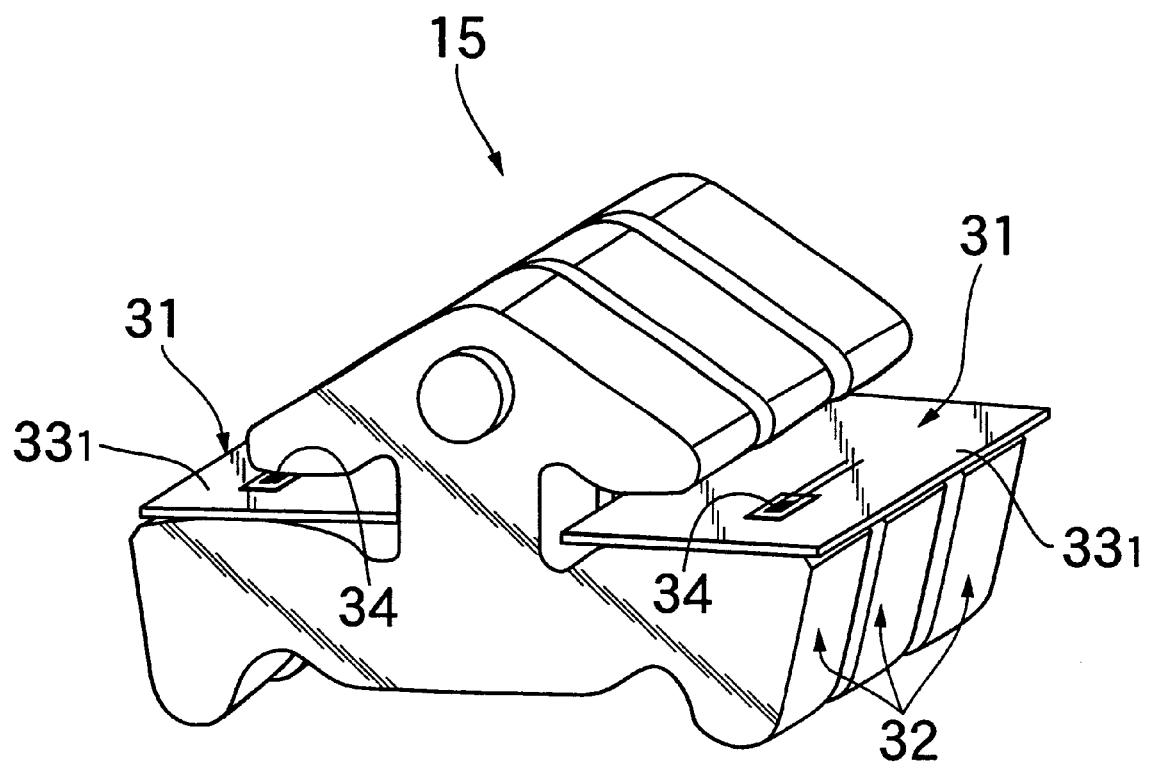

Therefore, the relationship between the change in tension $\Delta T_1$ applied to the single sheet of metal ring of the innermost layer and the change in tension $\Delta T_n$ applied to the other 11 sheets of metal rings has been examined by the means described below. As shown in FIG. 2, an actual metal ring assembly 31 comprises 12 sheets of metal rings $33_1$, $33_n$ . . . which are layered. However, as shown in FIG. 6 a metal belt type continuously variable transmission T was operated using only one sheet of metal ring 33 instead of the above-mentioned metal ring assembly. Here, a strain gauge 34 was attached to the radially outer surface of the metal ring 33 and the stress waveform applied to the metal ring 33 during operation was monitored. Next, two sheets of metal rings 33 were superimposed and installed, and the stress waveform applied to the metal ring 33 of the outermost layer was monitored by attaching the strain gauge 34 to the radially outer surface of the above-mentioned metal ring 33 of the outermost layer. The above-mentioned procedure was repeated, increasing the number of sheets of the metal rings 33 having an identical thickness one by one up to 5 sheets.

FIGS. 7A–7E shows the stress waveforms thus monitored and region A, region B, region C and region D correspond to region A, region B, region C and region D respectively shown in FIG. 3. The stress in region A and region C is due to the tension applied to the metal ring 33. The stress is low in region A which corresponds to the chord part on the relaxed side and is high in region C which corresponds to the chord part on the stretched side. In order that only tensile stress and no flexural stress is generated in region A and region C which correspond to the chord parts of the metal ring 33, the radius of curvature of the metal ring 33 in a free state is at infinity (i.e. straight line state).

If the difference between the tension in region C and the tension in region A here is examined, it is found that there is a distinct difference between a) when one sheet of the metal ring 33 is used (i.e. the stress applied to the metal ring 33 of the innermost layer which is in direct contact with the saddle surface $32_1$ of the metal element 32) and b) when more than one sheet of the metal rings 33 are used (i.e. the stress applied to the metal rings of layers other than the innermost layer). That is to say, only the metal ring 33 of the innermost layer has a stress characteristic which is greatly different from the stress characteristic of the metal rings 33 of layers other than the innermost layer. As hereinafter described, it has been found that the difference in tension between region C and region A for the metal ring 33 of the innermost layer is twice that of the metal rings 33 of layers other than the innermost layer.

Figure 8:
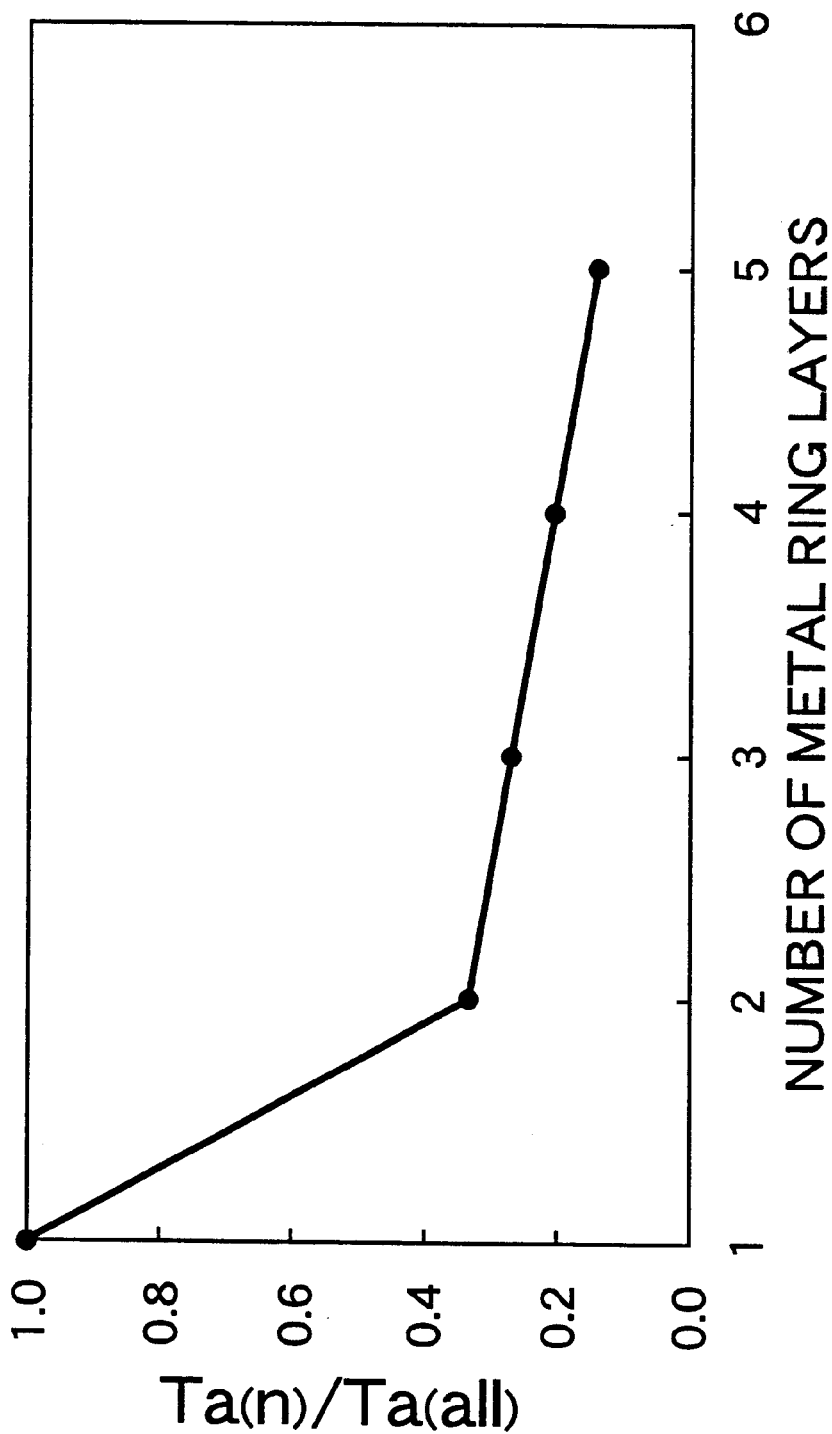

The graph shown in FIG. 8 was obtained from the above-mentioned measurement results. The abscissa denotes the number of layered sheets of metal rings 33 and the ordinate denotes the proportion $Ta_{(n)}/Ta_{(all)}$ of the difference in tension in the metal ring 33 of the outermost layer. The difference in tension of the metal ring 33 denotes the difference between the tension applied to the chord part on the stretched side and the tension applied to the chord part on the relaxed side. $Ta_{(n)}$ denotes the difference in tension for the metal ring 33 of the outermost layer and $Ta_{(all)}$ denotes the total difference in tension for all the metal rings 33 that are layered. When the number of layered sheets of the metal rings 33 is one, $Ta_{(n)}=Ta_{(all)}$ and thus $Ta_{(n)}/Ta_{(all)}=1.0$. When the number of layered sheets of the metal rings 33 is two, since $Ta_{(all)}$ is the sum of the differences in tension applied to the metal rings 33 and $Ta_{(n)}$ is the difference in tension applied to the metal ring 33 of the outermost layer (second layer), if the tensions applied to two sheets of the metal rings 33 are identical, $Ta_{(n)}/Ta_{(all)}$ should be 0.5, but actually $Ta_{(n)}/Ta_{(all)}$ equals 0.33. Similarly, when the number of layered sheets of the metal rings 33 is 3, 4 and 5, $Ta_{(n)}/Ta_{(all)}=0.25$, $Ta_{(n)}/Ta_{(all)}=0.20$ and $Ta_{(n)}/Ta_{(all)}=0,17$ respectively.

From the results above it has been found that the difference in tension applied to the metal ring 33 of the innermost layer is twice the difference in tension applied to the other metal rings 33. For example, when the number of layered sheets of the metal rings 33 is 5 sheets, the proportion of the difference in tension in the metal ring 33 of the innermost layer is two sixths of the total change in tension, and the other 4 sheets of the metal rings 33 have one sixths each of the total change in tension.

Therefore, as in the embodiment, when 12 sheets of metal rings $33_1$, $33_n$ . . . are layered, it can be surmised that the metal ring $33_1$ of the innermost layer would have 2 / 13 of the total change in tension and the remaining 11 sheets of metal rings $33_n$ . . . would have 1 /13 each of the total change in tension.

Figure 9:
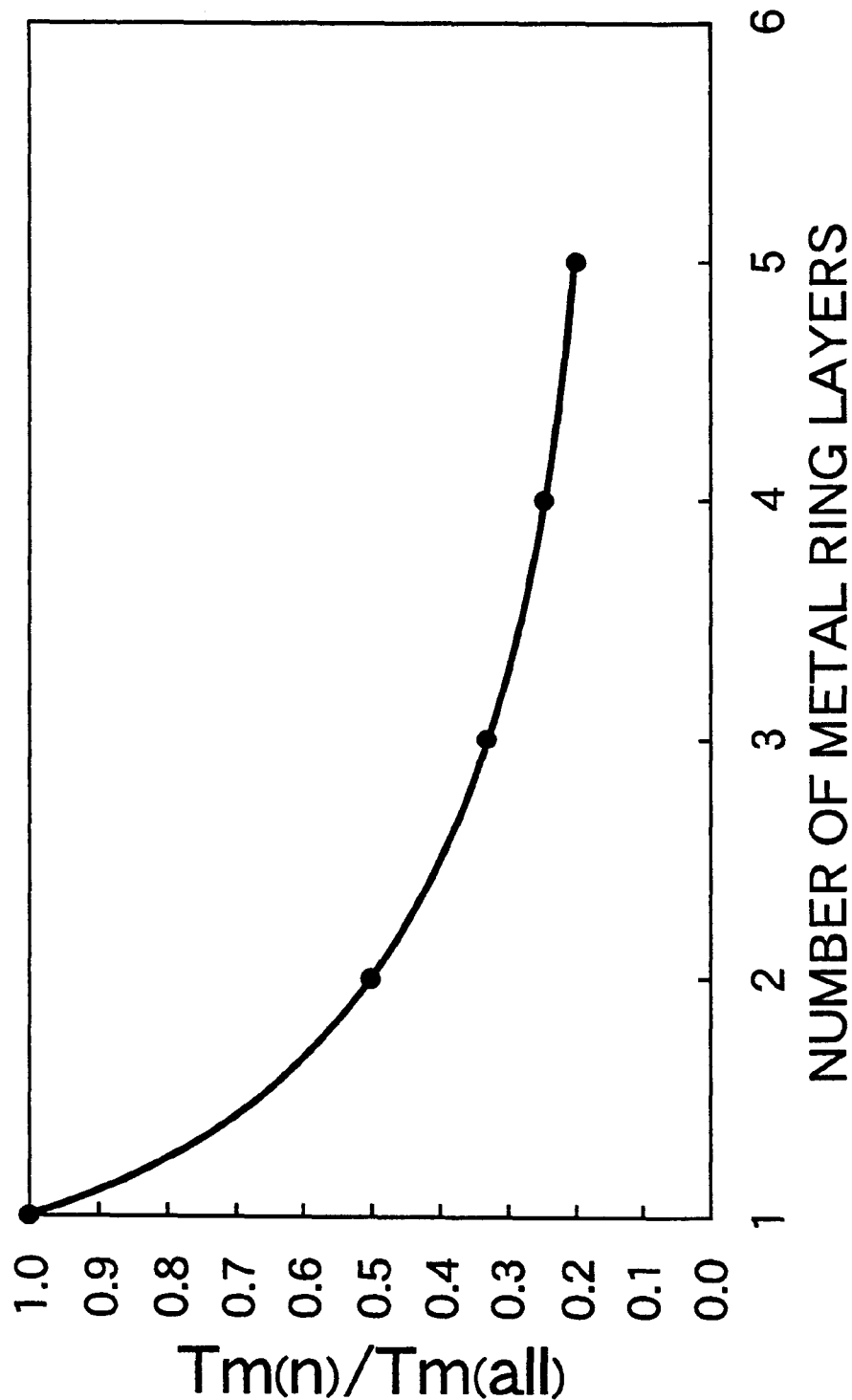

The graph shown in FIG. 9 was obtained from the above-mentioned measurement results. The abscissa denotes the number of layered sheets of the metal rings 33, and the ordinate denotes the proportion $Tm_{(n)}/Tm_{(all)}$ of the sum of the tensions in the metal ring 33 of the outermost layer. The sum of the tensions applied to a metal ring 33 here denotes the sum of the tension in the chord part on the stretched side and tension in the chord part on the relaxed side. $Tm_{(n)}$ is the sum of the tensions applied to the metal ring 33 of the outermost layer and $Tm_{(all)}$ is the sum of the tensions applied to all the metal rings 33 that are layered. When the number of layered sheets of the metal ring 33 is one, $Tm_{(n)}=Tm_{(all)}$ and $Tm_{(n)}/Tm_{(all)}=1.0$. When the number of layered sheets of the metal rings 33 is 2, 3, 4 and 5, $Tm_{(n)}/Tm_{(all)}=0.50$, $Tm_{(n)}/Tm_{(all)}=0.33$, $Tm_{(n)}/Tm_{(all)}=0.25$ and $Tm_{(n)}/Tm_{(all)}=0.20$ respectively.

It can be found from the results above that when the number of layers of the metal rings 33 is 5, each metal ring 33 has 1 / 5 of the sum of the tensions applied to the metal ring assembly 31 and it can be surmised that when the number of layers of metal rings $33_1$, $33_n$ . . . is 12, each metal ring $33_1$, $33_n$ . . . has 1 /12 of the sum of the tensions applied to the metal ring assembly 31. That is to say, it can be surmised that the distribution of the sum of the tensions applied to the metal ring assembly 31 is uniform in the radial direction (thickness direction).

The graph in FIG. 11 shows the change in tensile stress applied to the metal ring $33_1$ of the innermost layer of the present embodiment and the change in tensile stress applied to the other 11 sheets of metal rings $33_n$ . . . when the vehicle is in the maximum travelling speed state as explained in FIG. 3. The solid and broken lines in the above figure correspond to the case where the metal ring $33_1$ of the innermost layer has the same thickness as that of the other metal rings $33_n$ . . . The solid line denotes the change in tensile stress applied to the metal ring $33_1$ of the innermost layer, and the broken line denotes the change in tensile stress applied to the 11 sheets of metal rings $33_n$ . . . of layers other than the innermost layer. Due to the above-mentioned disparity between the ring-element coefficient of friction $\mu$s and the ring-ring coefficient of friction $\mu$r, the change in tension (i.e. change in stress) applied to the metal ring $33_1$ of the innermost layer is twice the change in tension (i.e. change in stress) applied to the other metal rings $33_1$ . . .

The single-dotted broken line and the double-dotted broken line in FIG. 11 denote a case (after improvement) where the thickness $t_1$ of the metal ring $33_1$ of the innermost layer is different from the thickness $t_n$ of the other metal rings $33_n$ . . . The single-dotted broken line denotes the change in tensile stress applied to the metal ring $33_1$ of the innermost layer, and the double-dotted broken line denotes the change in tensile stress applied to the 11 sheets of metal rings $33_n$ . . . of layers other than the innermost layer. This change in the stress characteristics resulting from the difference in thickness $t_1$ of the metal ring $33_1$ of the innermost layer is based on the tension sharing characteristics described in FIG. 8 and FIG. 9.

In addition to the tensile stress resulting from the above-mentioned tension, a tensile stress and a compressive stress resulting from the flexure of the metal rings $33_1$, $33_n$ . . . are also applied to the metal rings $33_1$, $33_n$ . . . As shown in FIGS. 10(a)–10(b), the metal rings $33_1$, $33_n$ . . . in the free state are in a circular form, but the metal rings $33_1$, $33_n$ . . . in an engaged state change into a shape having the above-mentioned regions A to D. The radius of curvature which is D / 2 in the free state increases to ∞ in the chord part on the relaxed side (region A) and the chord part on the stretched side (region C). In region B where the belt is wrapped around a drive pulley having a large diameter, the radius of curvature which is D / 2 in the free state decreases to $R_{DR}$. In region D where the belt is wrapped around a driven pulley having a small diameter, the radius of curvature which is D / 2 in the free state decreases to $R_{DN}$.

Thus, in region A and region C where the radius of curvature of the metal rings $33_1$, $33_n$ . . . increases, a stretching flexural stress is applied to the radially inner surfaces of the above-mentioned metal rings $33_1$, $33_n$ . . . and a compressive flexural stress is applied to the radially outer surfaces thereof. On the other hand, in region B and region D where the radius of curvature of the metal rings $33_1$, $33_n$ . . . decreases, a compressive flexural stress is applied to the radially inner surfaces of the above-mentioned metal rings $33_1$ $33_n$ . . . and a stretching flexural stress is applied to the radially outer surfaces thereof. These compressive and stretching flexural stresses change according to the thicknesses $t_1$, $t_n$ of the metal rings $33_1$, $33_n$ . . . That is to say, when the thicknesses $t_1$, $t_n$ of the metal rings $33_1$, $33_n$ . . . are large, the flexural stresses become large and when thicknesses $t_1$, $t_n$ of the metal rings $33_1$ 1 $33_n$ . . . are small the flexural stresses become small.

Figure 12:
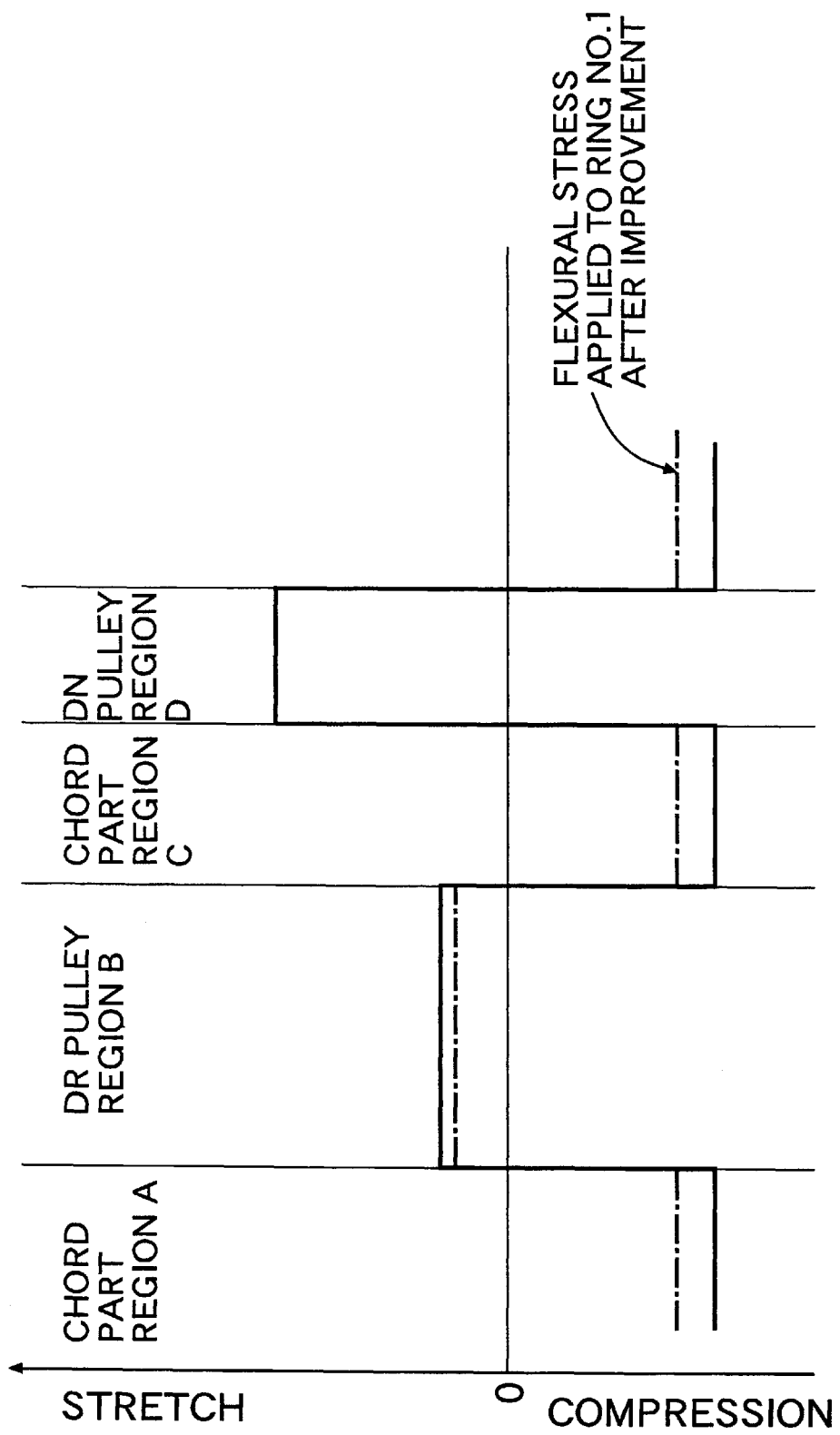

The graph shown in FIG. 12 illustrates the flexural stress applied to each of the radially outer surfaces of the 12 sheets of metal rings $33_1$, $33_n$ . . . when the vehicle is at a maximum travelling speed state described in FIG. 3. The solid line denotes the case where the thicknesses $t^1$, $t_n$ of the metal rings $33_1$, $33_n$ are identical. A constant compressive flexural stress is applied to the radially outer surfaces of each metal ring $33_1$, $33_n$ . . . in the two chord parts (region A and region C). A comparatively small stretching flexural stress is applied thereto in region B where they are wrapped around the drive pulley having a larger radius of curvature. Comparatively large stretching flexural stress is applied thereto in region D where they are wrapped around the driven pulley having a smaller radius of curvature. The single-dotted broken line denotes the flexural stress applied to the radially outer surface of the metal ring $33_1$ of the innermost layer when the thickness $t_1$ of the above-mentioned metal ring $33_1$ of the innermost layer is different from the thickness $t_n$ of the other metal rings $33_n$ . . . (after improvement). It has been found that the flexural stress characteristics change according to the change in thickness $t_1$.

Figure 13:
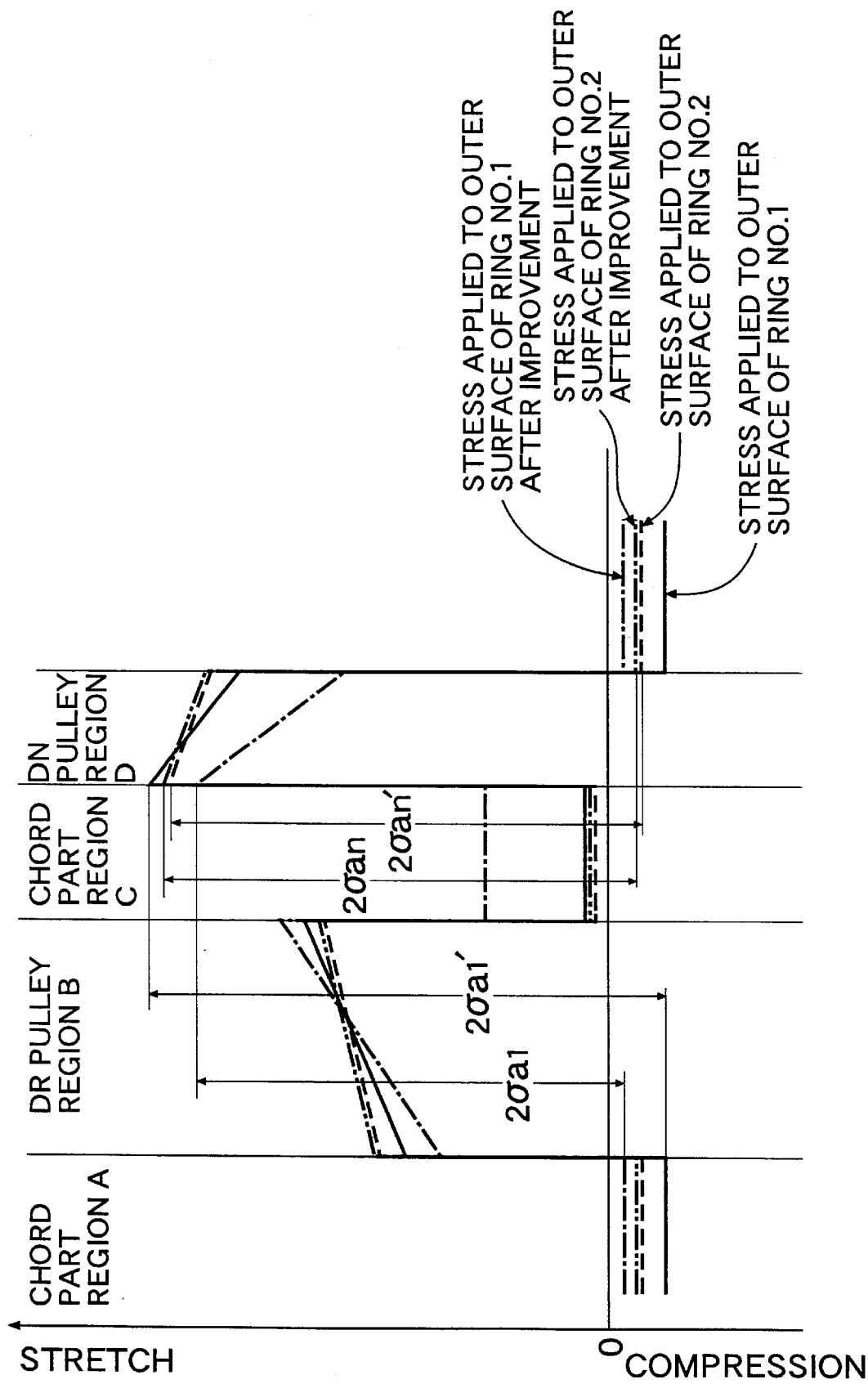

The graph shown in FIG. 13 illustrates the sums of a) the stress resulting from the tension applied to the metal rings $33_1$, $33_n$ . . . shown in FIG. 11 and b) the stress applied to the radially outer surfaces of the above-mentioned rings $33_1$, $33_n$ . . . resulting from the flexure of the metal rings $33_1$, $33_n$ . . . shown in FIG. 12. The solid line and the single-dotted broken line denote changes in the total stress applied to the radially outer surface of the metal ring $33_1$ of the innermost layer before and after improvement. The broken line and the double-dotted broken line denote changes in the total stress applied to the radially outer surface of the other metal rings $33_n$ . . . before and after improvement.

As is clear from this graph, before the improvement has been carried out and when the thickness $t^1$, $t_n$ . . . of each metal ring $33_1$, $33_n$ . . . is set so as to be identical (the solid line and the broken line), the stress amplitude $\sigma a_1$ applied to the metal ring $33_1$ of the innermost layer is larger than stress amplitude $\sigma a_n$ applied to the other metal rings $33_n$ . . . . As a result, the metal ring $33_1$ of the innermost layer fractures first. This is the principal cause for degradation of the life span of the metal ring assembly 31. However, after the improvement$_n$ where the thickness $t_1$ of the metal ring $33_1$ of the innermost layer is different from the thickness $t_n$ of the other metal rings $33_n$ . . . (the single-dotted broken line and the double-dotted broken line), the stress amplitude $\sigma a_1$ applied to the metal ring $33_1$ of the innermost layer is smaller than the stress amplitude Gan applied to the other metal rings $33_n$ . . . As a result the durability of the metal ring $33_1$ of the innermost layer can be enhanced and thus the life span of the metal ring assembly 31 can be increased.

A means to set the thickness $t_1$ of the metal ring $33_1$ of the innermost layer at an appropriate level is explained below.

TABLE 1

| | |
|---|---|
| Tension applied to the chord part on the stretched side (total) | T1 |
| Tension applied to the chord part on the relaxed side (total) | T2 |
| Tension applied to the chord part on the stretched side (ring of the innermost layer) | $T1_1$ |
| Tension applied to the chord part on the relaxed side (ring of the innermost layer) | $T2_1$ |
| Tension applied to the chord part on the stretched side (other rings) | $T1_n$ |
| Tension applied to the chord part on the relaxed side (other rings) | $T2_n$ |
| Sheet width | w |
| Thickness (ring of the innermost layer) | $t_1$ |
| Thickness (other rings) | $t_n$ |

First of all, on the basis of the assumption (see FIG. 8) that the change in tension $\Delta T_1$ applied to the metal ring $33_1$ of the innermost layer is twice the change in tension $\Delta T_n$ n applied to the other metal rings $33_n$, the following equation can be derived from the balance of forces applied to the metal ring $33_1$ of the innermost layer;

$$(T1-T2)*(2/13)=T1_1-T2_1 \quad (7)$$

and the following equation can be derived from the balance of forces applied to the other metal rings $33_n$ . . .

$$(T1-T2)*(1/13)=T1_n-T2_n \quad (8)$$

On the basis of the assumption (see FIG. 9) that the distribution of the sum of the tensions applied to the metal ring assembly 31 is uniform in its radial direction (thickness direction), the following equation can be derived from the balance of forces applied to the metal ring $33_1$ of the innermost layer;

$$(T1+T2)/\{2w\ (t_1+11t)\}=(T1_1+T2_1)/(2wt_1) \quad (9)$$

and the following equation can be derived from the balance of forces applied to the other metal rings $33_n$ . . .

$$(T1+T2)/\{2w\ (t_1+11t)\} = (T1_n+T2_n)/(2wt) \quad (10)$$

Figure 14:
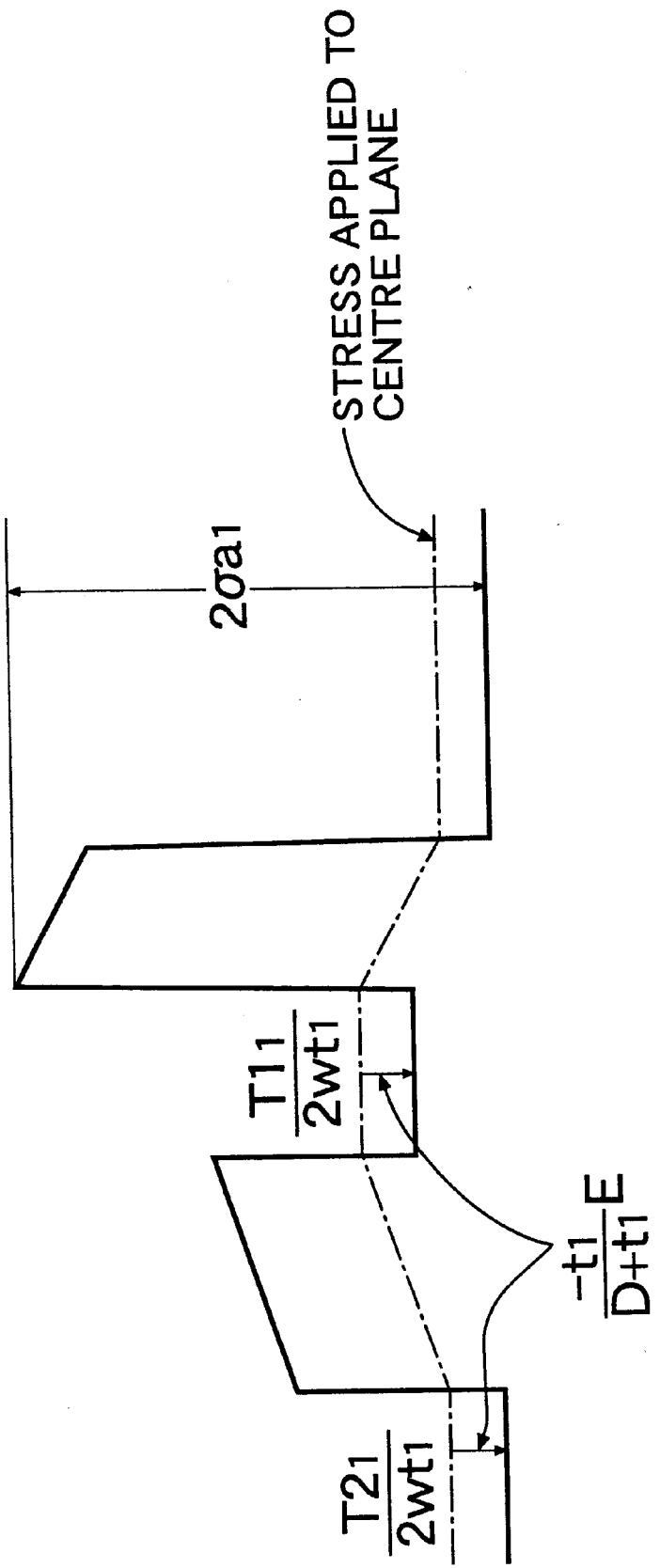

As is clear by reference to the change in stress applied to the radially outer surface of the metal ring $33_1$ of the innermost layer shown in FIG. 14, the stress amplitude $\sigma a_1$ applied to the radially outer surface of the metal ring $33_1$ of the innermost layer is given by equation (11) below. In a similar manner, the stress amplitude $\sigma a_n$ applied to the radially outer surfaces of the other metal rings $33_n$ . . . is given by equation (12) below. The average stresses $\sigma m_1$, $\sigma m_n$ . . . applied to the outer surfaces of the metal ring $33_1$ of the innermost layer and the other metal rings $33_n$ . . . are given by equation (13) and equation (14) respectively. In equation (11) to equation (14), E denotes the Young's modulus, D denotes the diameter of metal rings $33_1$, $33_n$ . . . in the free state and $d_o$ denotes the diameter of the pulley around which metal rings $33_1$, $33_n$ . . . are wrapped.

Equation 1

$$2\sigma a_1 = \frac{T I_1}{2wt_1} + \frac{t_1(D-d_0-t_1)}{(d_0+t_1)(D+t_1)}*E - \left(\frac{T2_1}{2wt_1} + \frac{-t_1}{D+t_1}*E\right) \quad (11)$$

Equation 2

$$2\sigma a_n = \frac{T I_n}{2wt} + \frac{t(D-d_0-t)}{(d_0+t_1)(D+t)}*E - \left(\frac{T2_n}{2wt} + \frac{-t}{D+t}*E\right) \quad (12)$$

Equation 3

$$2\sigma m_1 = \frac{T I_1}{2wt_1} + \frac{t_1(D-d_0-t_1)}{(d_0+t_1)(D+t_1)}*E + \frac{T2_1}{2wt_1} + \frac{-t_1}{D+t_1}*E \quad (13)$$

Equation 4

$$2\sigma m_n = \frac{T I_n}{2wt} + \frac{t(D-d_0-t)}{(d_0+t)(D+t)}*E + \frac{T2_n}{2wt} + \frac{-t}{D+t}*E... \quad (14)$$

Figure 15:
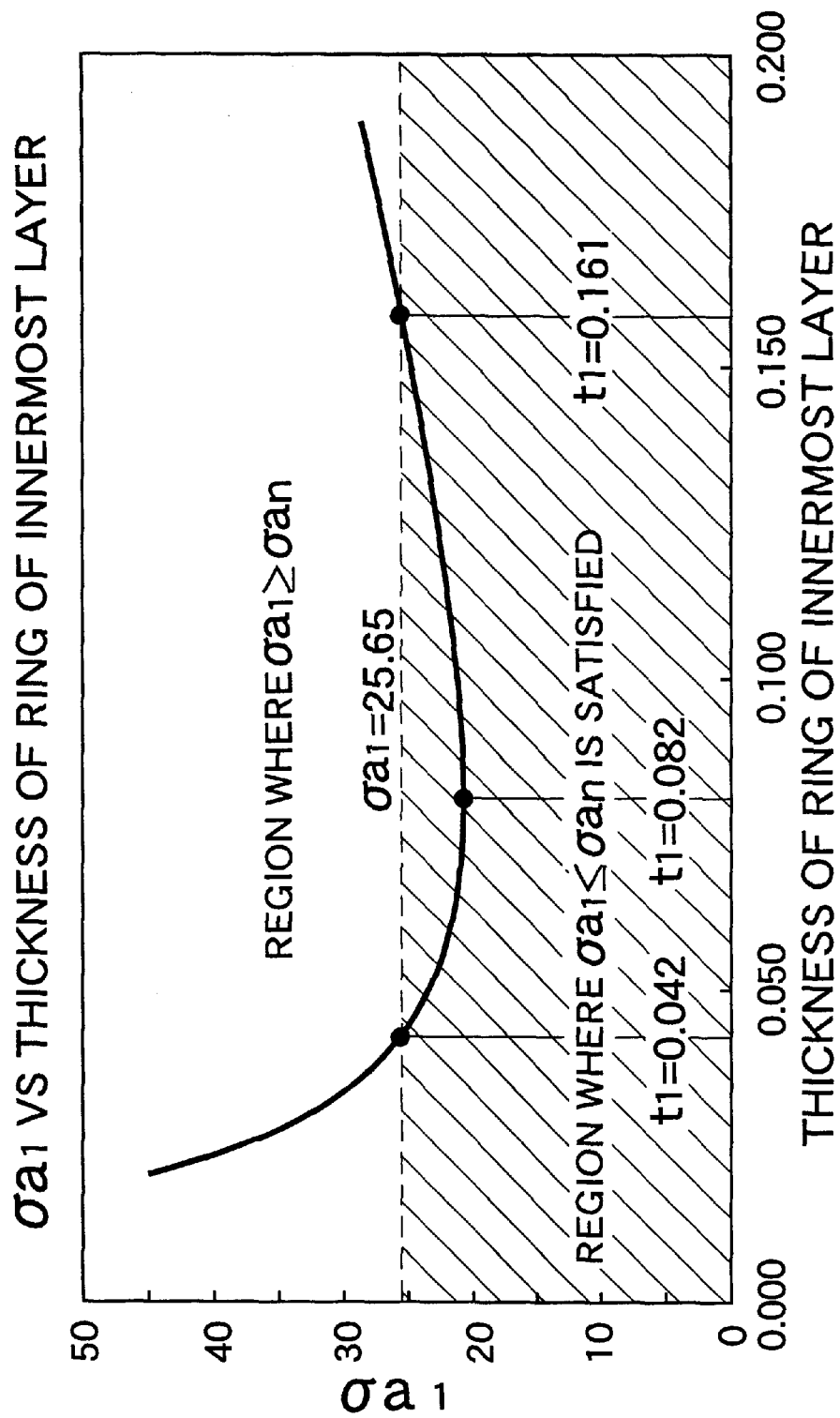

The graph shown in FIG. 15 illustrates the results of calculating the relationship between the thickness $t_1$ of the metal ring $33_1$ of the innermost layer (abscissa) and the stress amplitude $\sigma a_1$ applied to the metal ring $33_1$ of the innermost layer (ordinate) under high speed durability conditions based on the above-mentioned equations (7) to (12). The specifications for the operating conditions of the metal belt type continuously variable transmission T are given in Table 2. By applying these specifications to an equation disclosed in Japanese Patent Application Laid-Open No. 10-89429, the tension T1 in the chord part on the stretched side of the metal ring assembly 31 and the tension T2 in the chord part on the relaxed side thereof are calculated. By using these tensions T1 and T2 in the above-mentioned equations (11) and (12), the stress amplitude $\sigma a_1$ applied to the metal ring $33_1$ of the innermost layer and the stress amplitude $\sigma a_n$ applied to the other metal rings $33_n$ . . . can be calculated.

TABLE 2

| | |
|---|---|
| Input rotation rate; Nin | 6000 rpm |
| Input torque; Tin | 14.3 kgf · m |
| Gear ratio; i | 0.61 |
| Pressure on the driven pulley side; Pdn | 9.29 kmf/cm$^2$ |
| Sheet width; w | 9.2 mm |
| Thickness (other rings) ; $t_n$ | 0.185 mm |

In FIG. 15, when the thickness of the metal ring $33_1$ of the innermost layer satisfies the relationship 0.042 mm $\leq t_1$ $\leq 0.161$ mm at a thickness $t_n$ of the other metal rings $33_n$ . . . of 0.185 mm, the stress amplitude $\sigma a_1$ applied to the metal ring $33_1$ of the innermost layer becomes smaller than the stress amplitude $\sigma a_n$ applied to the other metal rings $33_n$ . . . (=25.56 kgf / mm$^2$).

When the thickness $t_1$ of the metal ring $33_1$ of the innermost layer is 0.082 mm, the stress amplitude $\sigma a_1$ applied to the metal ring $33_1$ of the innermost layer becomes a minimum value of 20.72 kgf / mm$^2$ (see Table 3). That is to say, if the thickness of the metal ring $33_1$ of the innermost layer is set so as to satisfy the relationship 0.042 mm $\leq t_1 \leq 0.161$ mm, the stress amplitude $\sigma a_1$ applied to the above-mentioned metal ring $33_1$ of the innermost layer can be made smaller than the stress amplitude $\sigma a_n$ applied to the other metal rings $33_n$. Thus, the metal ring $33_1$ of the innermost layer can be prevented from fracturing at an early stage which degraded the life span of the entire metal ring assembly 31.

TABLE 3

| $t_1$ | $\sigma a_1$ | $\sigma a_n$ | $\sigma m_1$ | $\sigma m_n$ |
|---|---|---|---|---|
| 0.042 | 25.65 | 25.65 | 19.94 | 23.00 |
| 0.082 | 20.72 | 25.65 | 20.45 | 22.64 |
| 0.161 | 25.65 | 25.65 | 21.46 | 21.96 |

Table 3 also gives the average stress $\sigma m_1$ applied to the metal ring $33_1$ of the innermost layer and average stress $\sigma m_n$ applied to the other metal rings $33_n$ . . . which are calculated based on the above-mentioned equations (13) and (14). As is clear from Table 3, the maximum average stress $\sigma m_1$ applied to the metal ring $33_1$ of the innermost layer is reduced to 21.46 kgf / mm$^2$, and the maximum average stress $\sigma m_n$ applied to the other metal rings $33_n$ is also reduced to 23.00 kgf / mm$^2$. Therefore, the average stresses $d\sigma m_1$, $\sigma m_n$ applied both to the innermost metal ring $33_1$ and to the other metal rings $33_n$ . . . do not increase greatly even when the thickness $t_1$ of the metal ring $33_1$ of the innermost layer is changed.

Figure 16:
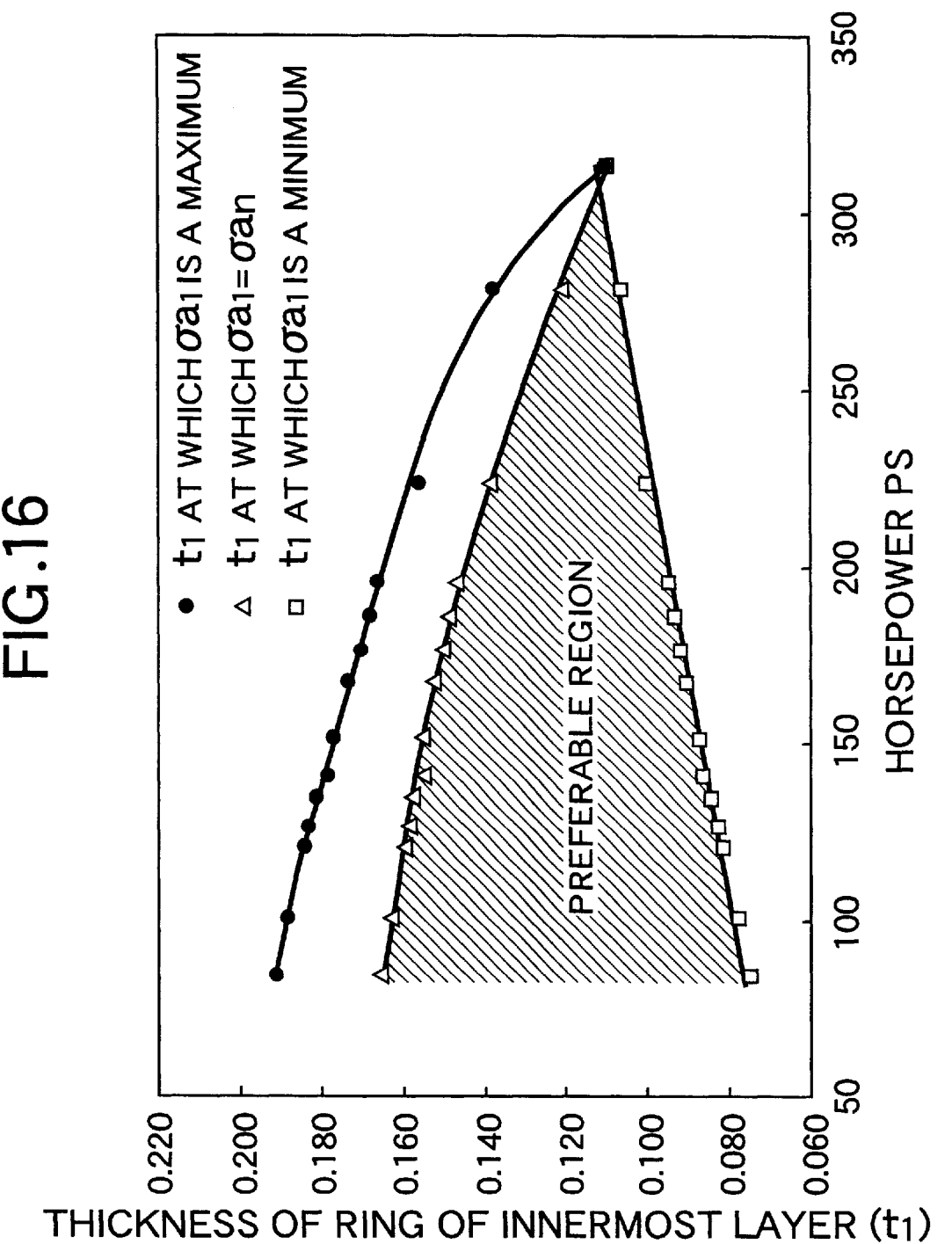

FIG. 16 shows the thickness $t_1$ (indicated by Δ) of the metal ring $33_1$ of the innermost layer at which the stress amplitude $\sigma a_1$ coincides with the stress $\sigma a_n$ and the thickness $t_1$ (indicated by □) of the metal ring $33_1$ of the innermost layer at which the stress amplitude $\sigma a_1$ becomes a minimum value when the input horsepower to the metal belt type continuously variable transmission T is varied. That is to say, when the thickness $t_1$ of the metal ring $33_1$ of the innermost layer is in the hatched region, the stress amplitude σa₁ can be reduced to σa_n or less, thus increasing the life span of the metal ring assembly 31. In particular, if the thickness t₁ of the metal ring 33₁ of the innermost layer is set at 0.113 mm, the life span of the metal ring assembly 31 can be increased in the entire region up to the maximum input horsepower value of 312 PS.

Figure 17:
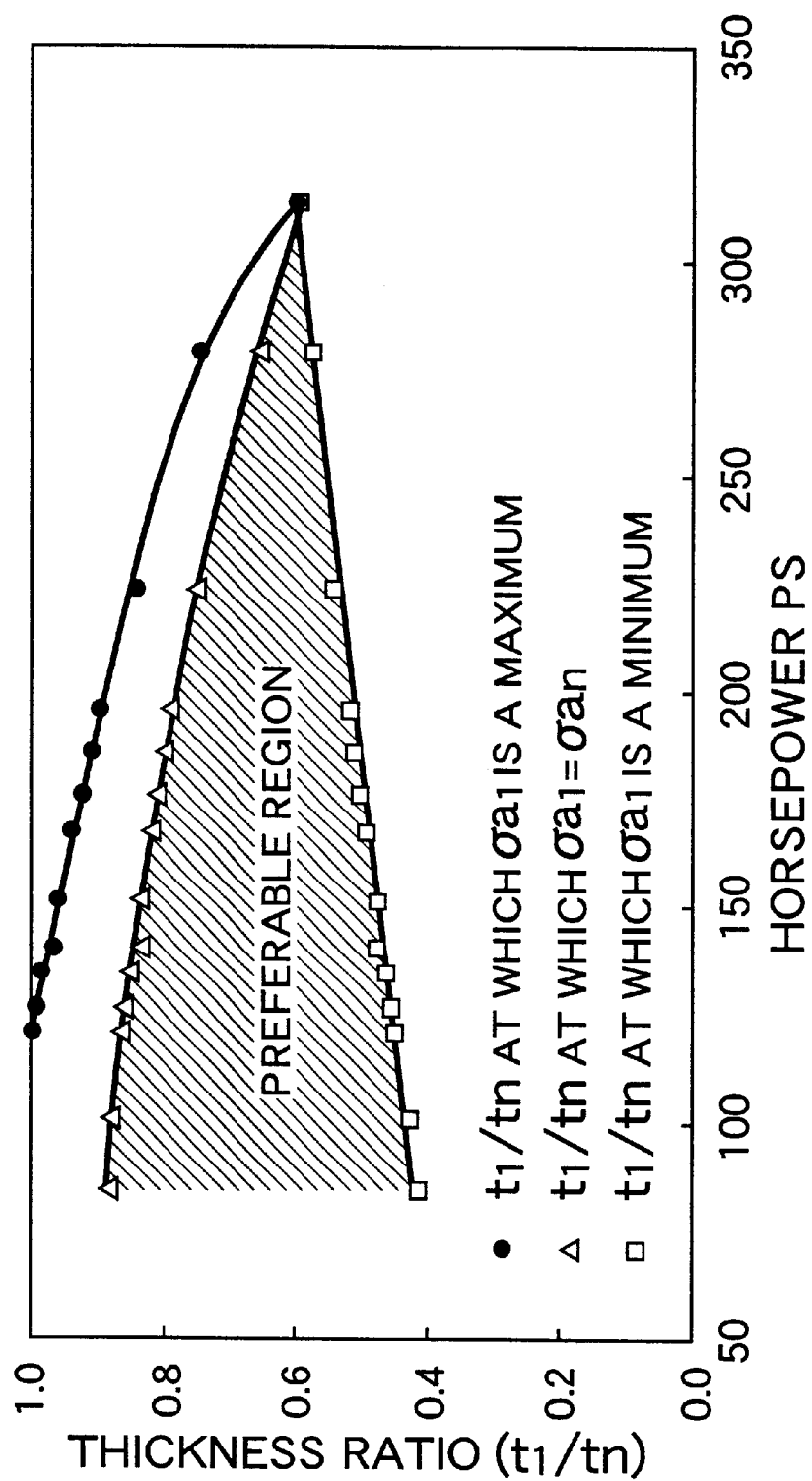

In FIG. 17 the ordinate of FIG. 16 is converted into a ratio t₁/t_n of the thickness t₁ of the metal ring 33₁ of the innermost layer relative to the thickness t_n (=0.185 mm) of the other metal rings 33_n . . .

As hereinbefore described, in accordance with a first aspect of the invention by differentiating the thickness of the metal ring of the innermost layer from the thickness of the other metal rings so as to differentiate the flexural stress applied to the metal ring of the innermost layer from the flexural stress applied to the other metal rings, the total stress amplitude applied to the metal ring of the innermost layer can be reduced so as to be not more than the total stress amplitude applied to the other metal rings. Therefore, the durability of the metal ring of the innermost layer, which is used under the most severe conditions, can be made higher than the durability of the other metal rings in order to increase the life span of the entire metal ring assembly.

In accordance with a second aspect of the invention, if the difference between the tension applied to the chord part on the stretched side and the tension applied to the chord part on the relaxed side of the metal ring of the innermost layer is different from the difference between the tension of the chord part on the stretched side and the tension of the chord part on the relaxed side of the metal rings of layers other than the innermost layer and the sum of the tension of the chord part on the stretched side and the tension of the chord part on the relaxed side of the metal ring assembly is distributed evenly in the radial direction of the metal ring assembly, the thickness of the metal ring of the innermost layer can be set appropriately.

Furthermore, in accordance with a third aspect of the invention, if the thickness of the metal ring of the innermost layer is set so that at a maximum horsepower operating state the stress amplitude applied to the aforementioned metal ring of the innermost layer coincides with the stress amplitude applied to the metal rings of layers other than the innermost layer, the durability of the metal ring of the innermost layer can be increased to the highest level under all operating conditions including the most severe operating conditions at the maximum horsepower operating state.

Although the appropriate thickness t₁ of the metal ring 33₁ of the innermost layer was determined above based on the stress amplitudes σa₁, σa_n applied to the radially outer surfaces of the metal rings 33₁, 33_n . . . an appropriate thickness may be determined based on the stress amplitudes applied to the radially inner surfaces since the forces applied to the metal rings are distributed evenly in the radial direction.

The present invention is described in detail above, but the present invention can be modified in a variety of ways without departing from the spirit and scope of the invention.

What is claimed is:

1. A belt for a continuously variable transmission comprising:

a metal ring assembly formed by multiple endless metal rings, the metal ring assembly having an innermost metal ring and a stacked series of other metal rings surrounding the innermost metal ring thereby forming multiple layers of endless metal rings; and a plurality of metal elements supported on said metal ring assembly, wherein a thickness of the innermost metal ring is different from a thickness of the other metal rings, and wherein the thickness of the innermost metal ring is set so that a stress amplitude applied to the innermost metal ring is not more than a stress amplitude applied to the other metal rings.

2. The belt for a continuously variable transmission according to claim 1, wherein the thickness of the innermost metal ring is set based upon the stress amplitude provided that 1) a difference between tension applied to a chord part on a stretched side and tension applied to a chord part on a relaxed side of the innermost metal ring is different from a difference between a tension of a chord part on the stretched side and a tension of a chord part on the relaxed side of the other metal rings, and 2) a sum of the tension of the chord part on the stretched side and the tension of the chord part on the relaxed side of the metal ring assembly is distributed evenly in a radial direction of the metal ring assembly.

3. The belt for a continuously variable transmission according to claim 1, wherein the thickness of the innermost metal ring is set so that at a maximum horsepower operating state, the stress amplitude applied to the innermost metal ring coincides with the stress amplitude applied to the other metal rings.

4. The belt for a continuously variable transmission according to claim 2, wherein the thickness of the innermost metal ring is set so that at a maximum horsepower operating state, the stress amplitude applied to the innermost metal ring coincides with the stress amplitude applied to the other metal rings.

* * * * *